United States Patent
Nakajima

(10) Patent No.: US 8,126,331 B2
(45) Date of Patent: Feb. 28, 2012

(54) WAVELENGTH DIVISION MULTIPLEXING TRANSMISSION DEVICE AND WAVELENGTH DIVISION MULTIPLEXING TRANSMISSION METHOD

(75) Inventor: Ichiro Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 12/634,075

(22) Filed: Dec. 9, 2009

(65) Prior Publication Data
US 2010/0150563 A1 Jun. 17, 2010

(30) Foreign Application Priority Data
Dec. 12, 2008 (JP) .................. 2008-317044

(51) Int. Cl.
*H04J 14/02* (2006.01)

(52) U.S. Cl. .......................................... 398/94; 398/82

(58) Field of Classification Search .................. 398/82, 398/94
See application file for complete search history.

(56) References Cited

U.S. PATENT DOCUMENTS

| 7,440,648 B2 | 10/2008 | Oikawa |
| 7,466,748 B2 | 12/2008 | Maeda |
| 7,555,220 B2 * | 6/2009 | Grubb et al. .............. 398/147 |
| 2006/0093258 A1 | 5/2006 | Terahera |

FOREIGN PATENT DOCUMENTS

| JP | 2004-258409 A | 9/2004 |
| JP | 2006-133336 A | 5/2006 |
| JP | 2006-243571 A | 9/2006 |
| JP | 3954072 B2 | 5/2007 |

OTHER PUBLICATIONS

Tsuboi, Osamu et al.,"A2-Axis Comb-driven Micromirror Array for 3D MEMS Optical Switch", IEEJ Trans. SM, vol. 123, No. 10 2003, 398-402. English-language Abstract.

* cited by examiner

*Primary Examiner* — Leslie Pascal
(74) *Attorney, Agent, or Firm* — Fujitsu Patent Center

(57) ABSTRACT

The power level of a wavelength division multiplexed optical signal is detected by a detection unit. When the power level of the optical signal detected by the detection unit is equal to or lower than a first threshold, the coupling direction of an attenuation unit for controlling the coupling direction for the ports of the optical signal is controlled in the direction orthogonal to the array direction of the ports. When the power level of the optical signal exceeds a second threshold, the coupling direction of the attenuation unit is controlled in the array direction of the ports.

15 Claims, 36 Drawing Sheets

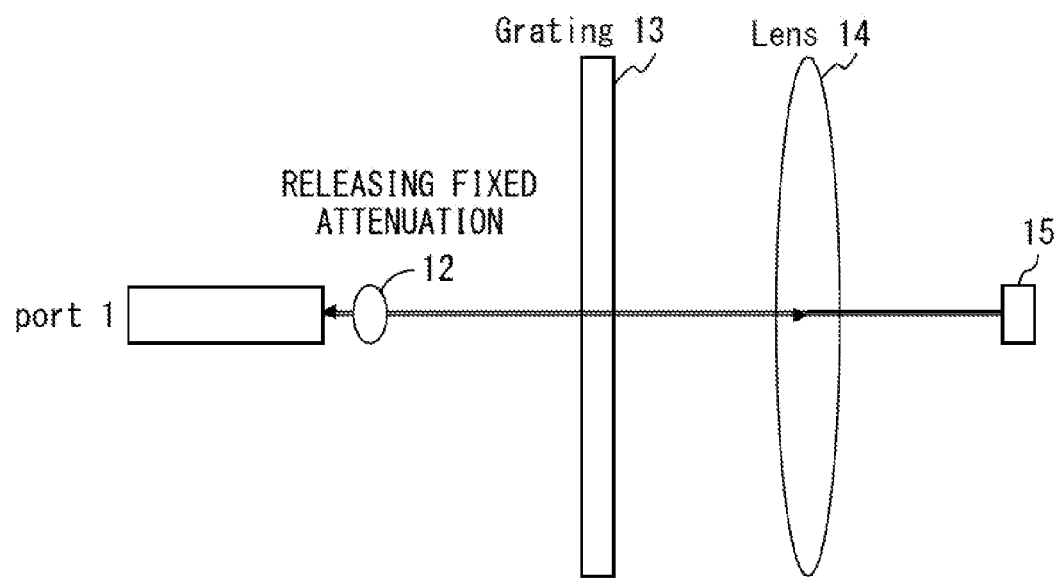
F I G. 4 A

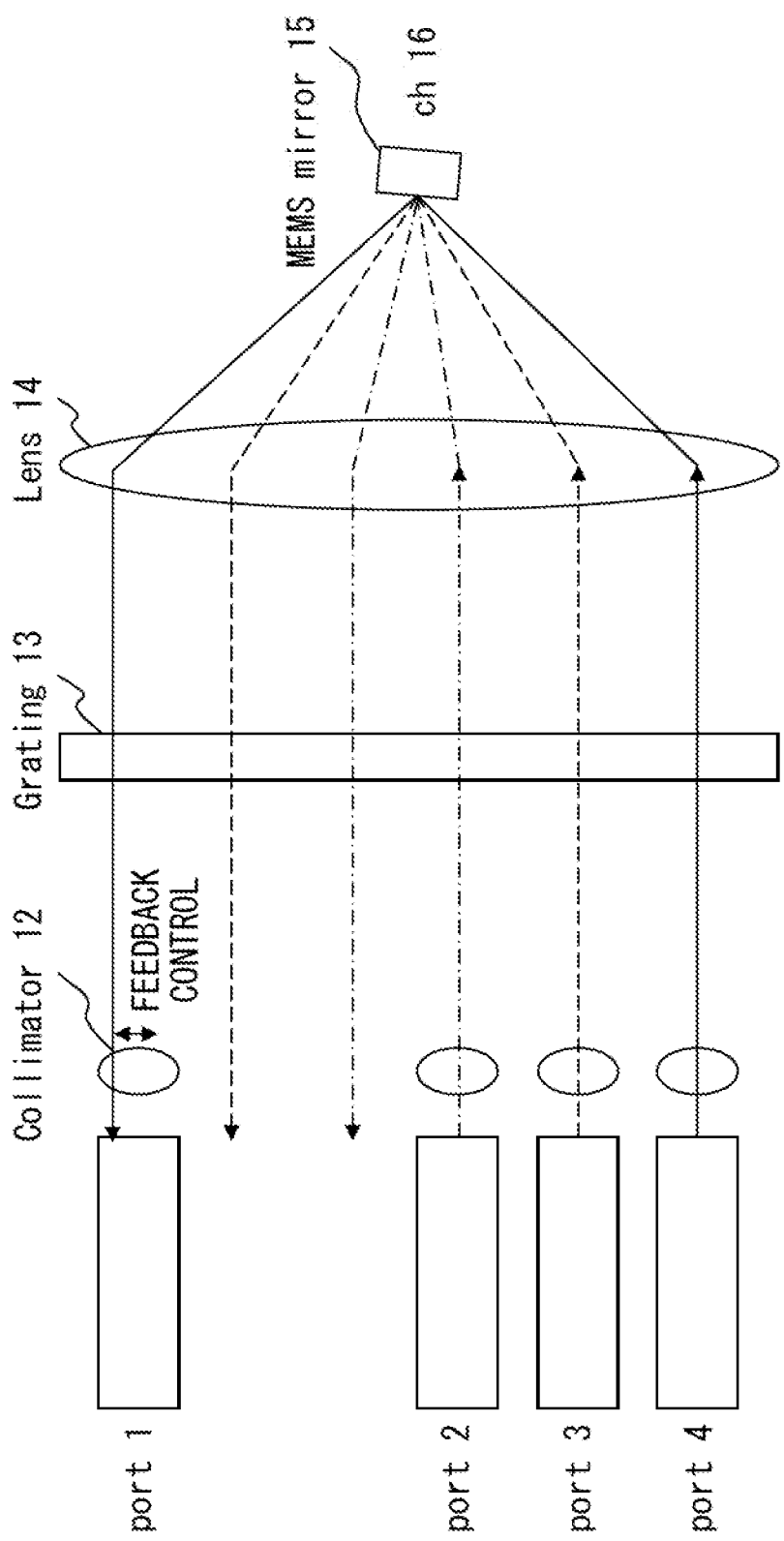
F I G. 4 B

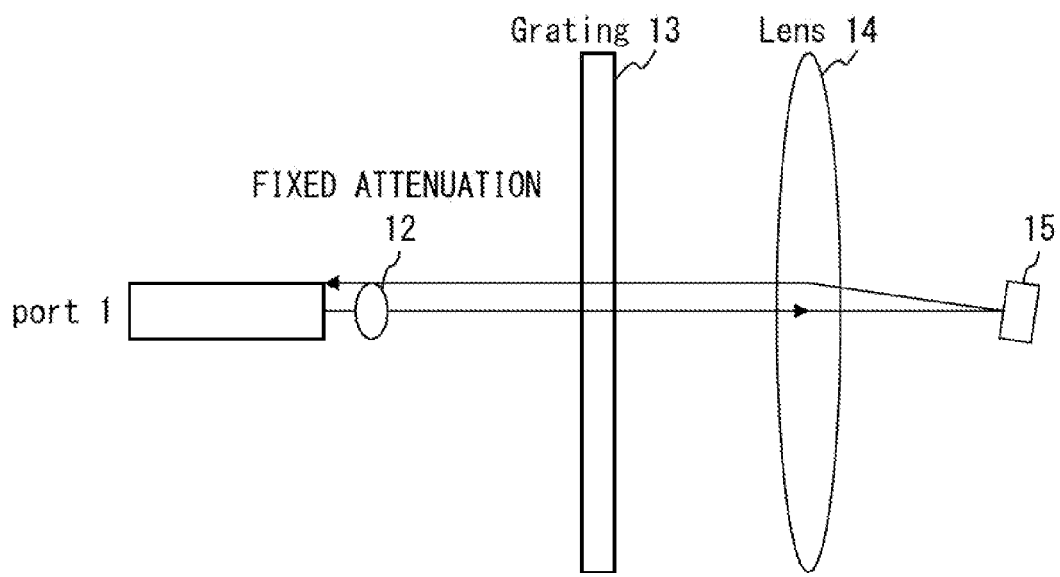
F I G. 7B

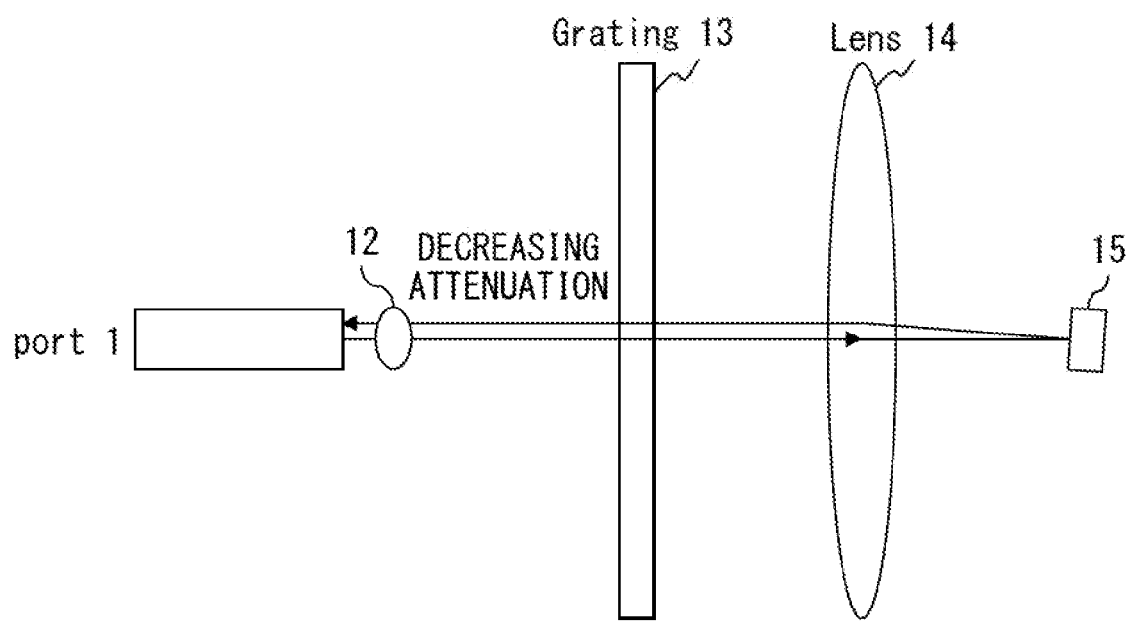
F I G. 8A

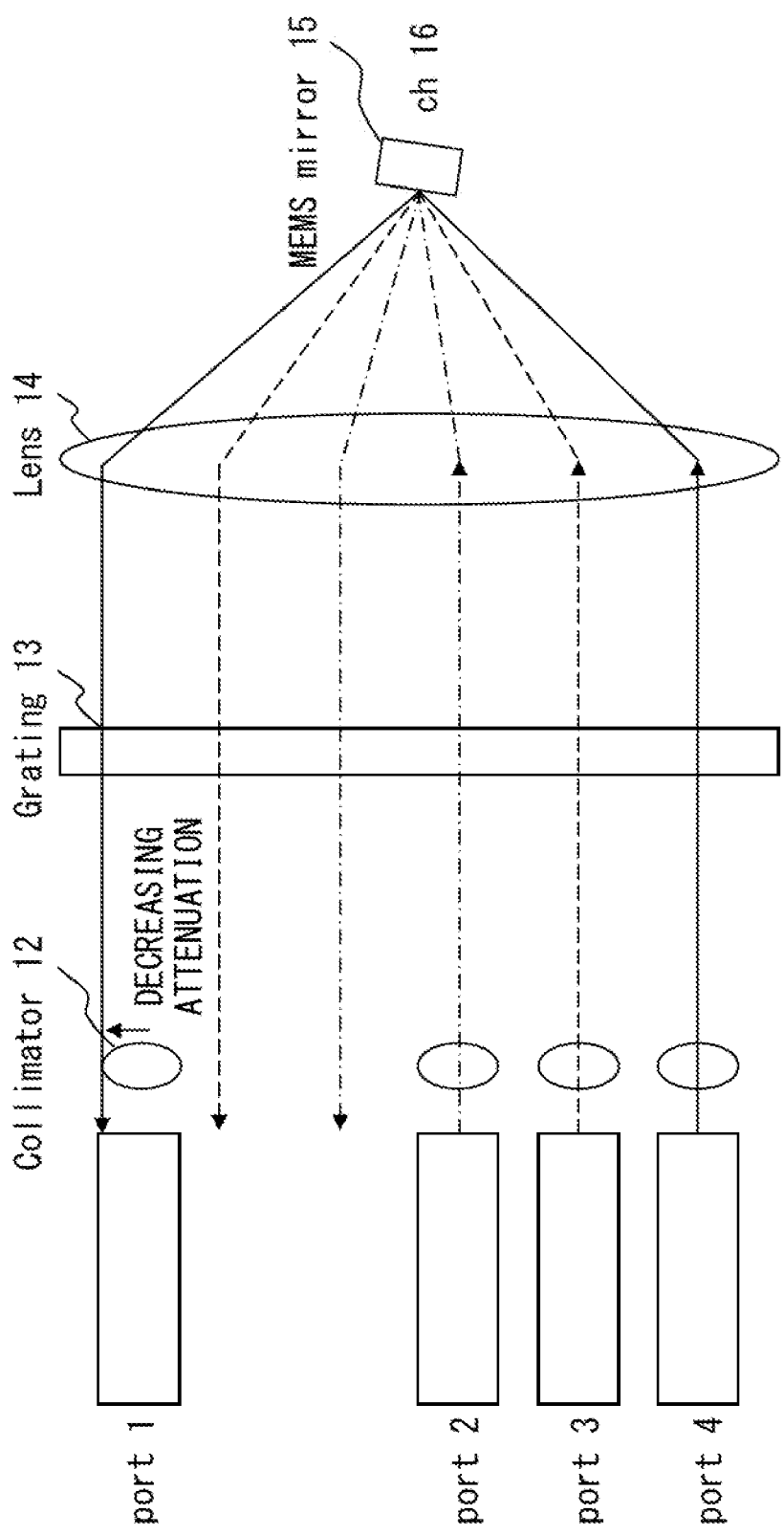
F I G. 8B

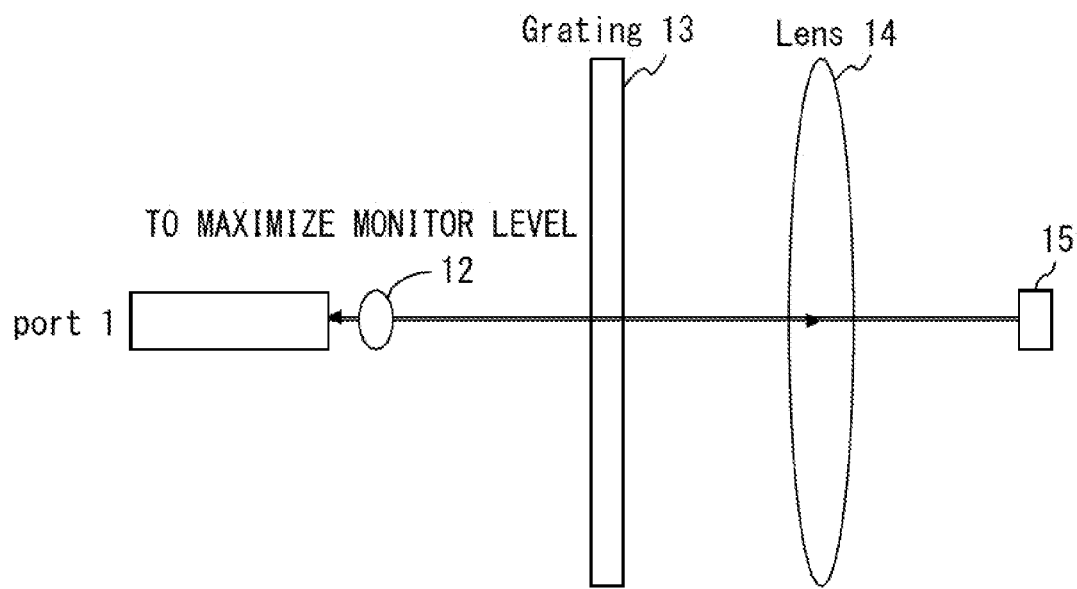
F I G. 9A

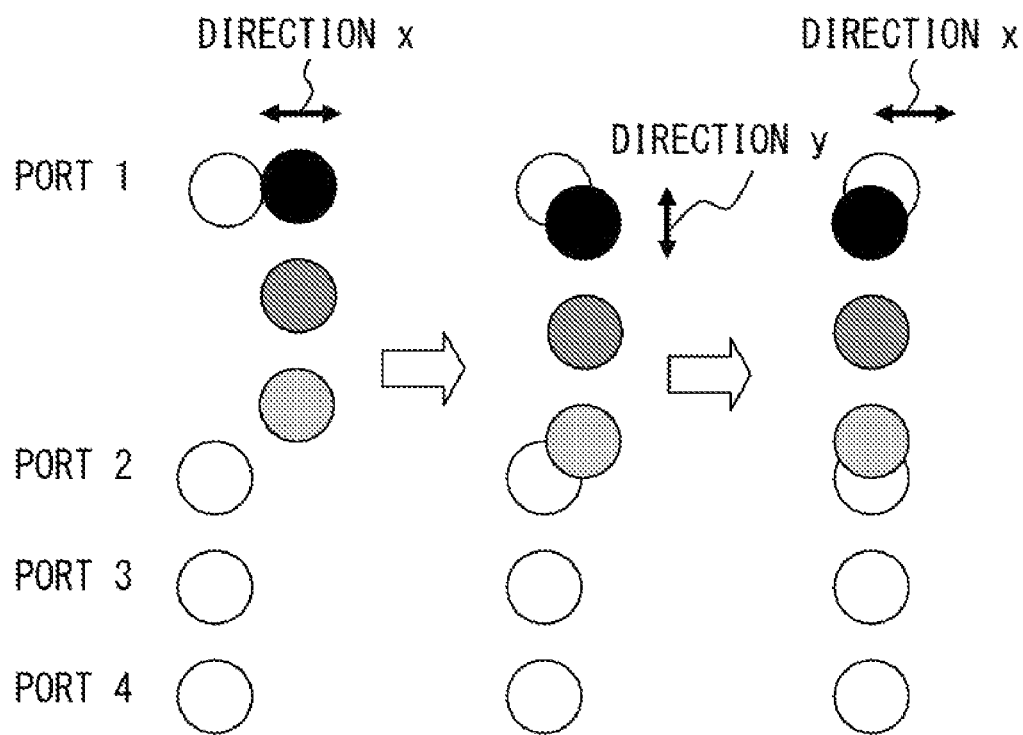
F I G. 1 2

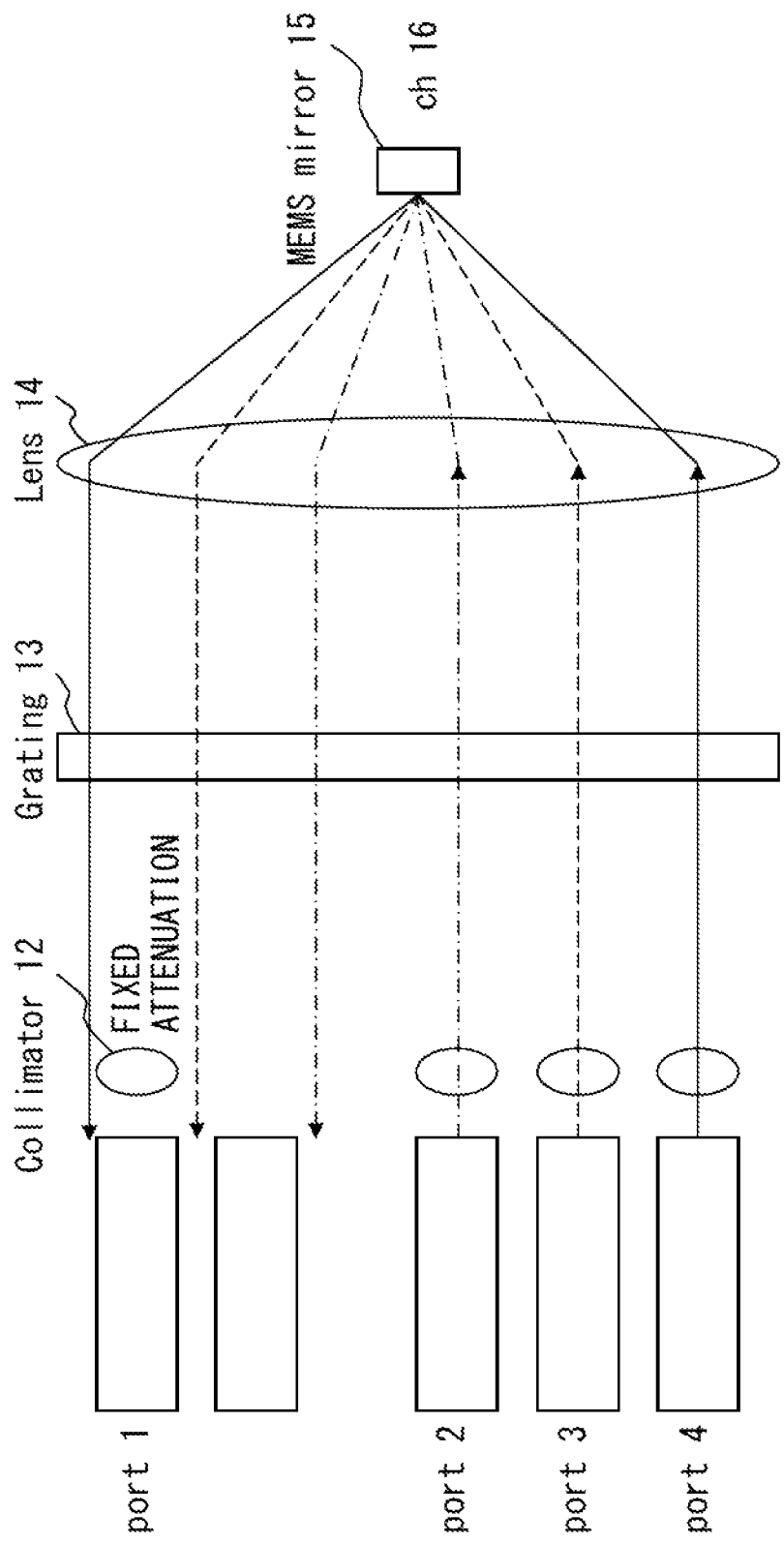
F I G. 1 3

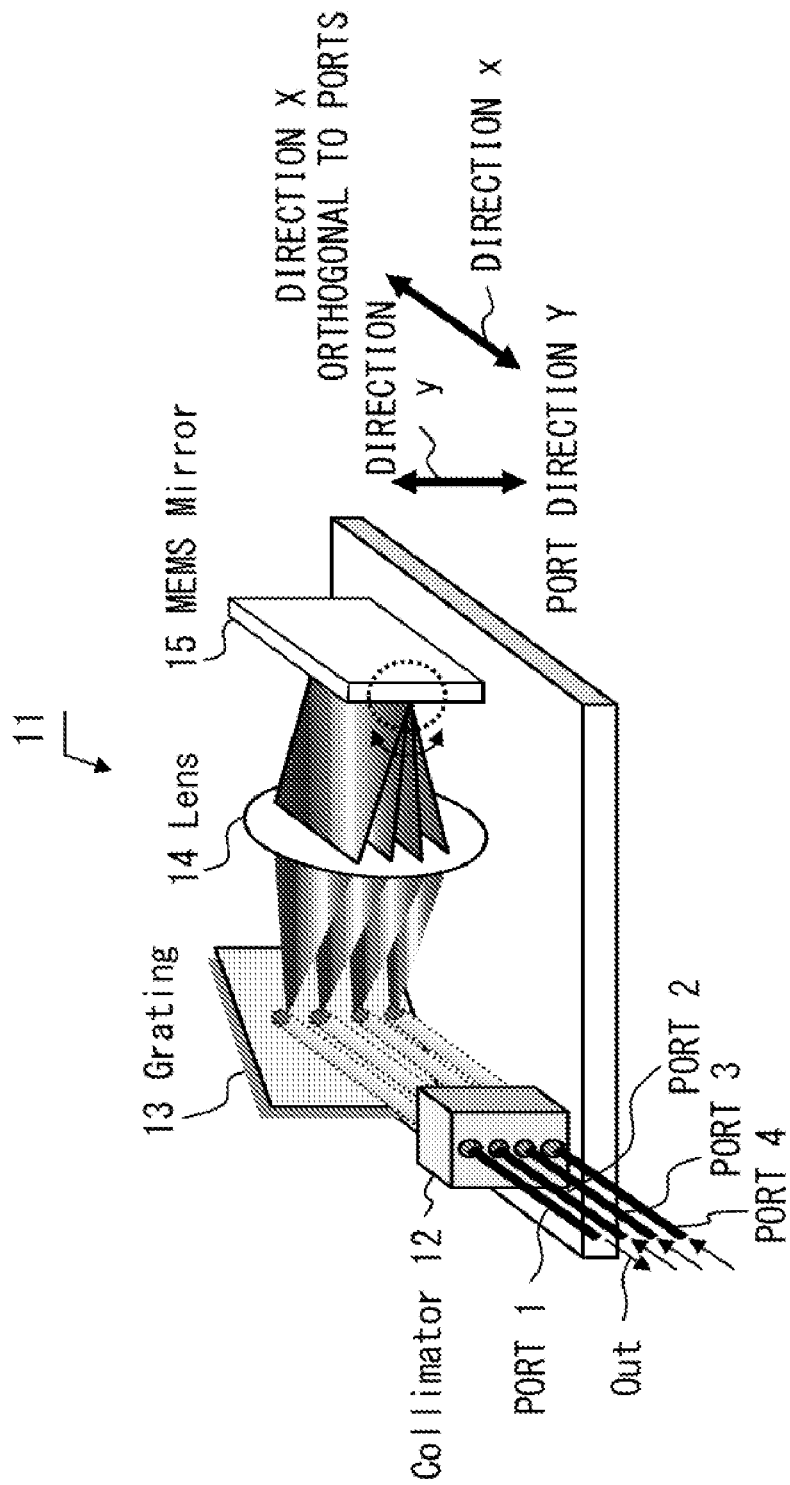
F I G. 15

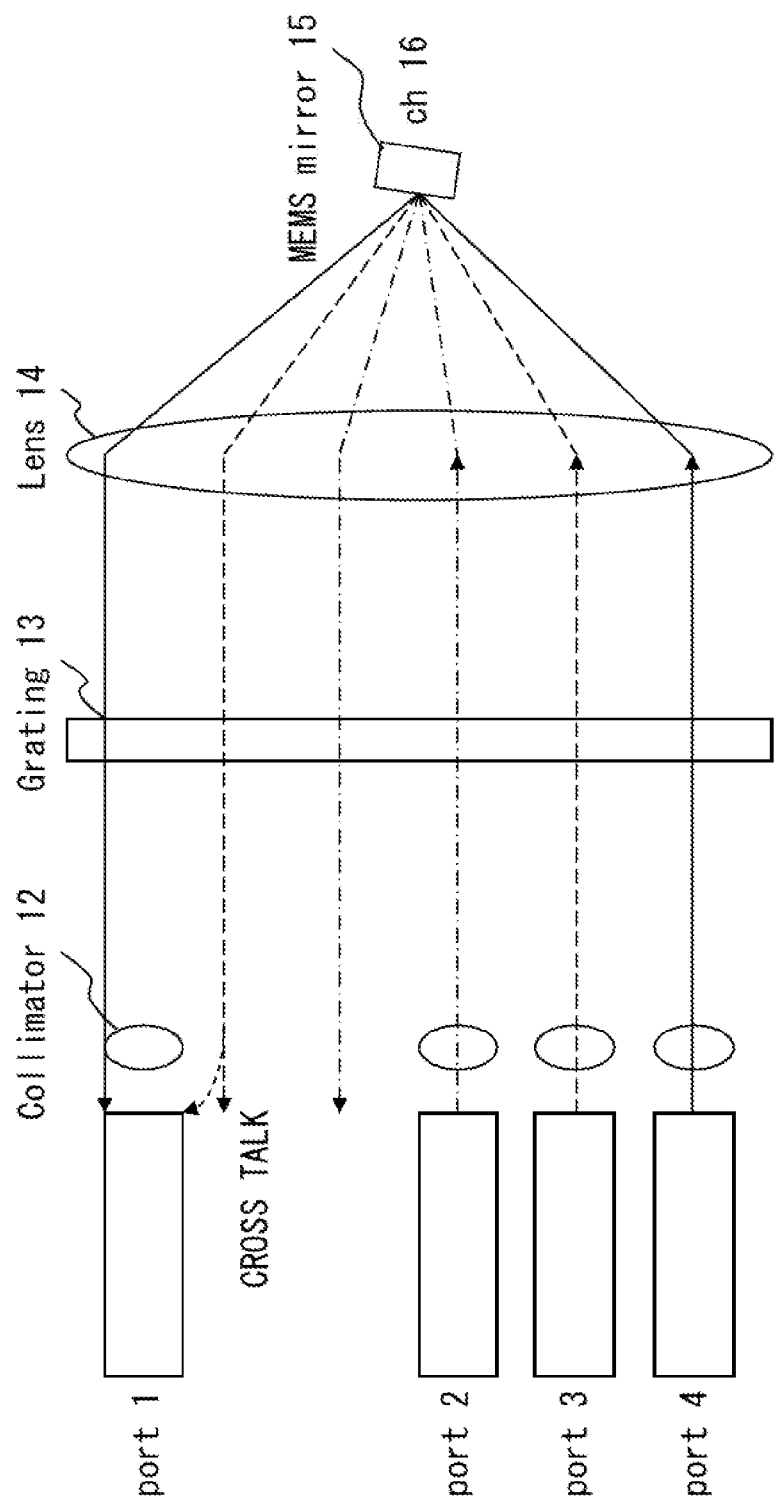
F I G. 1 9 B

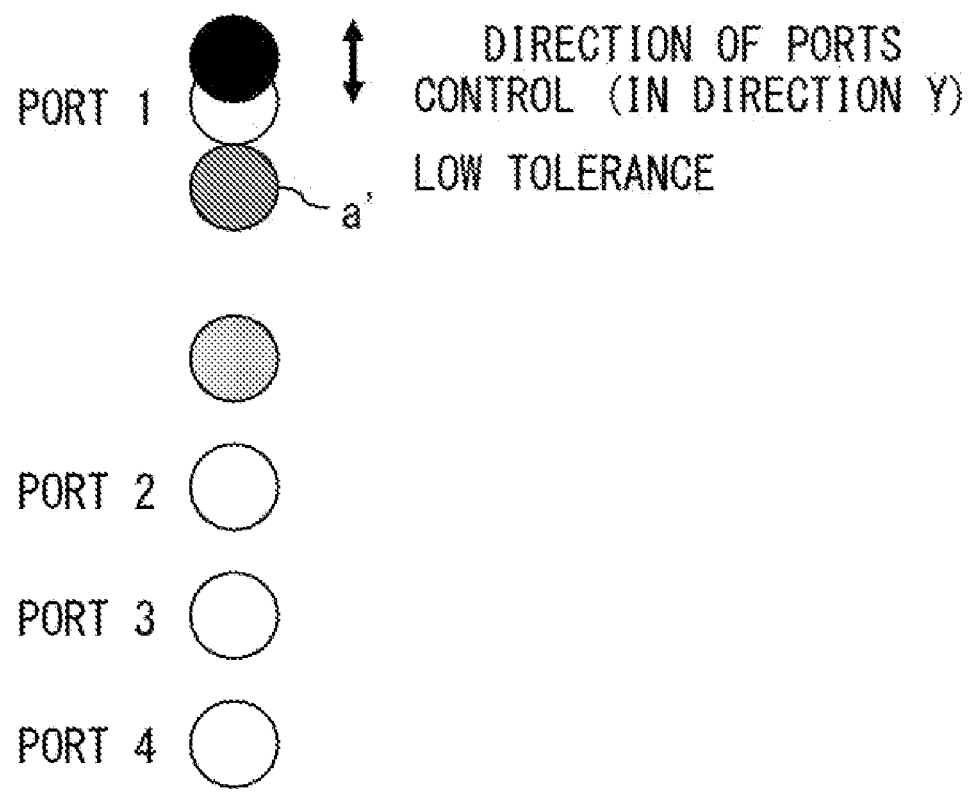
F I G. 2 0

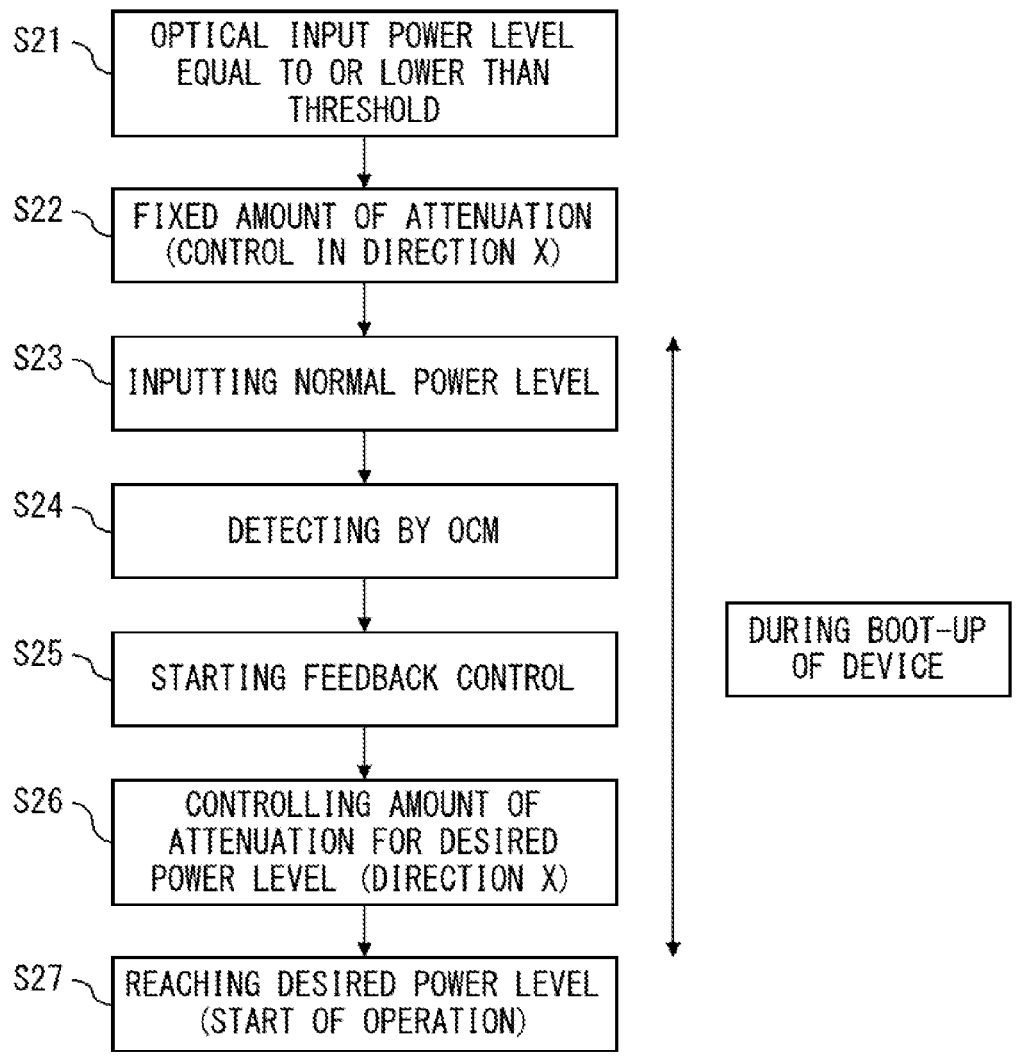
F I G. 2 1

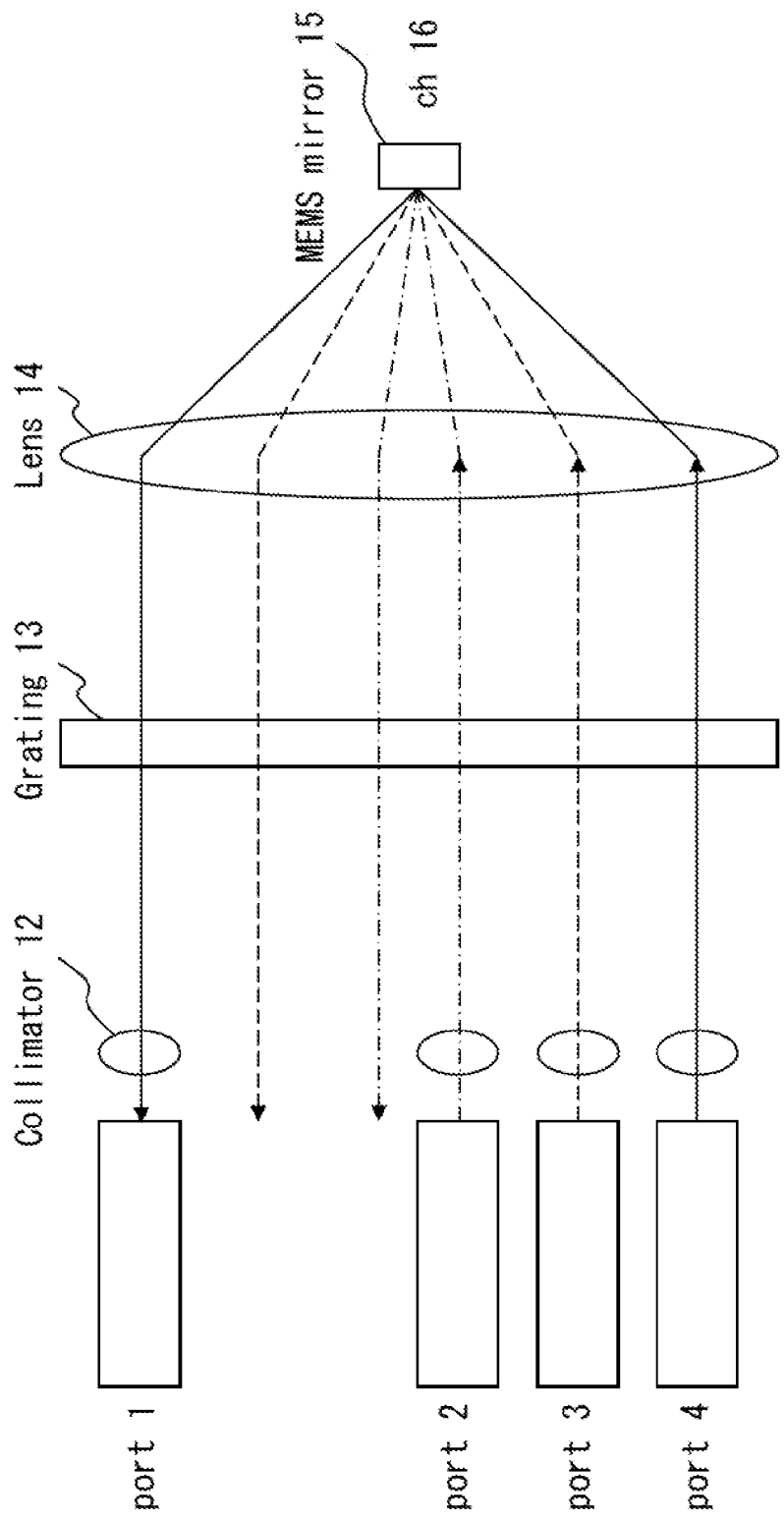
F I G. 22A

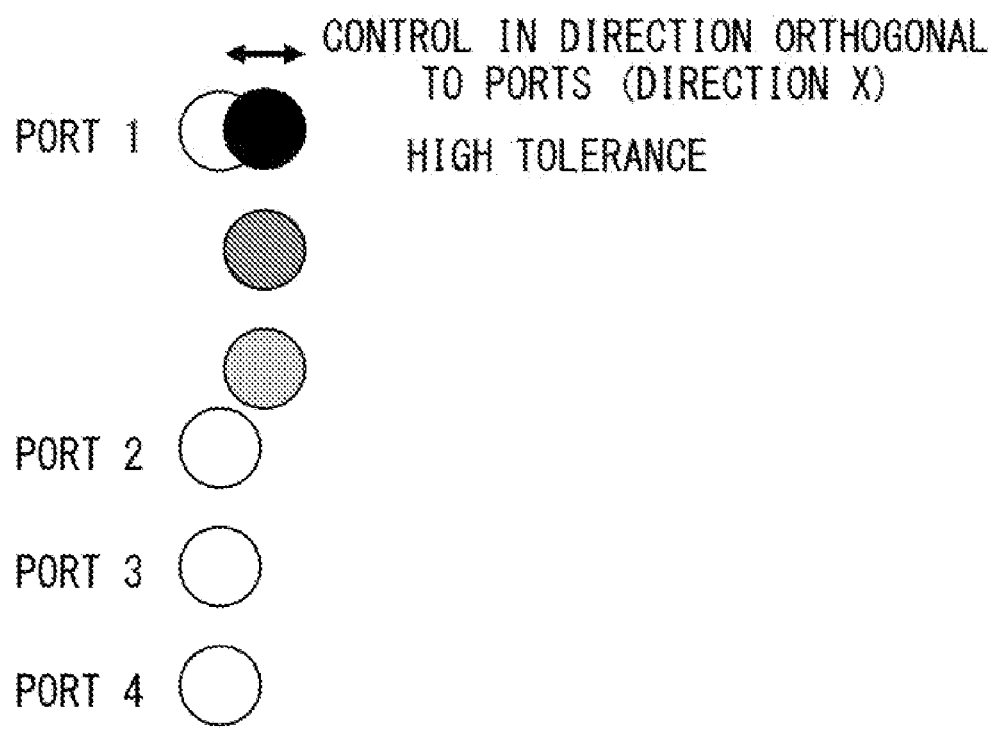
F I G. 2 3

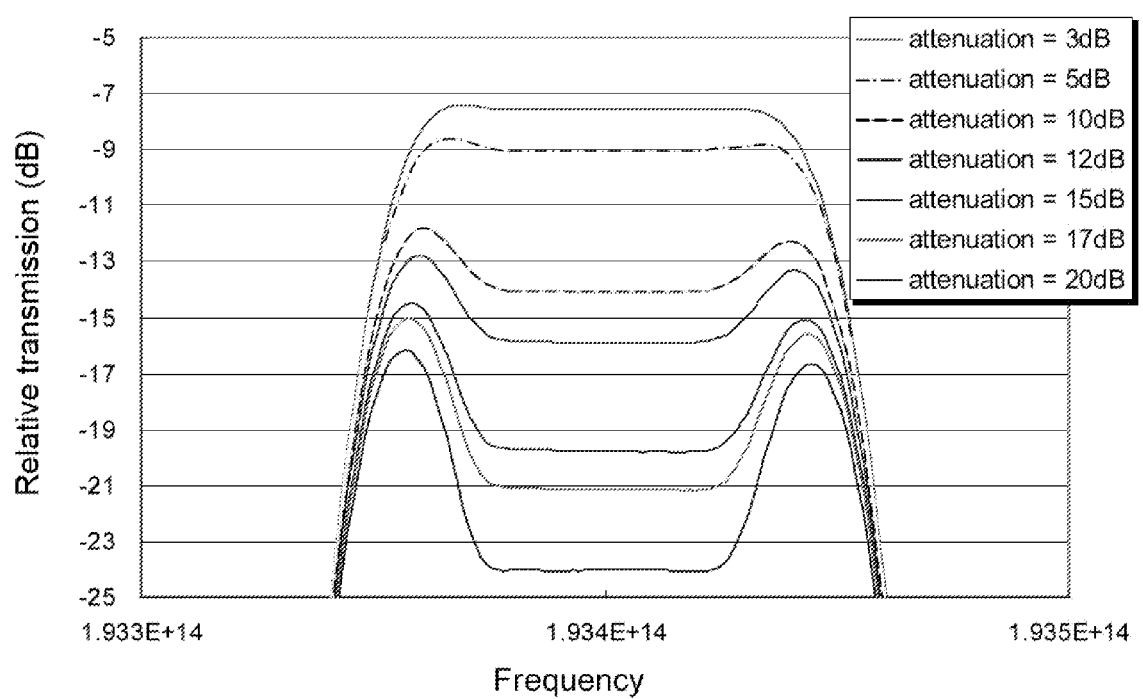
F I G. 2 4

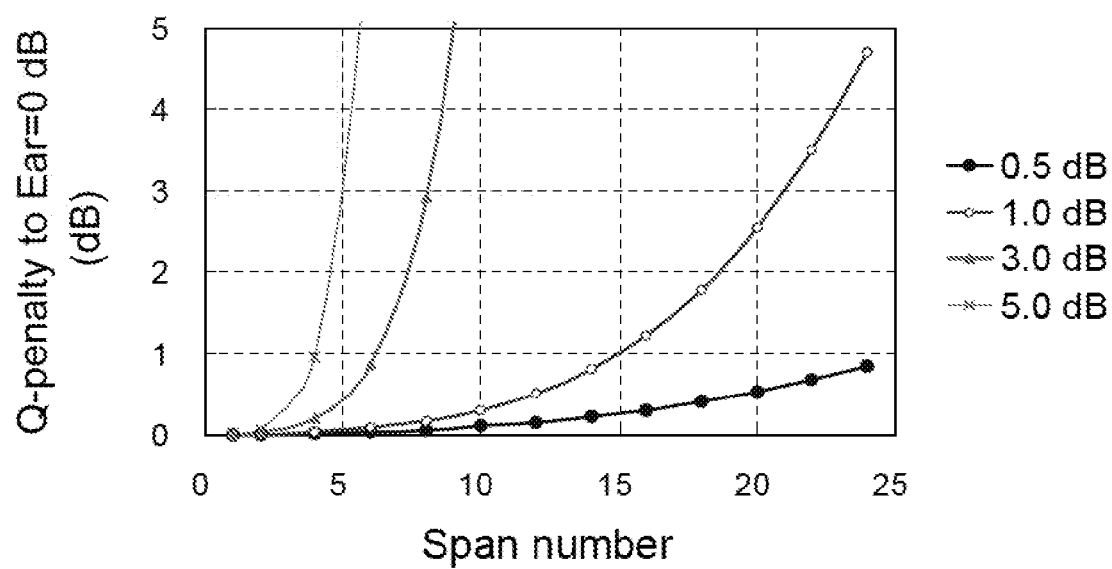
F I G. 2 6

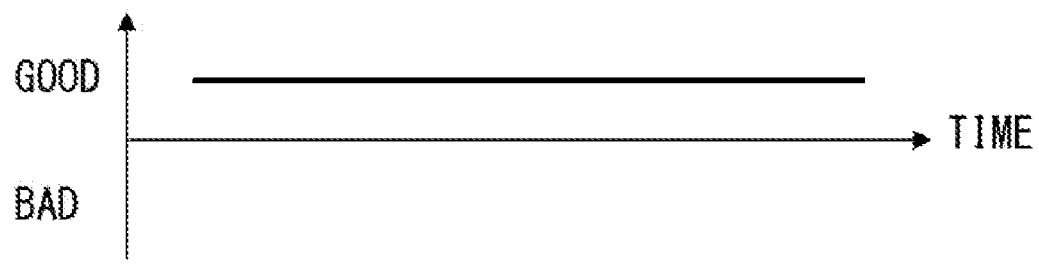
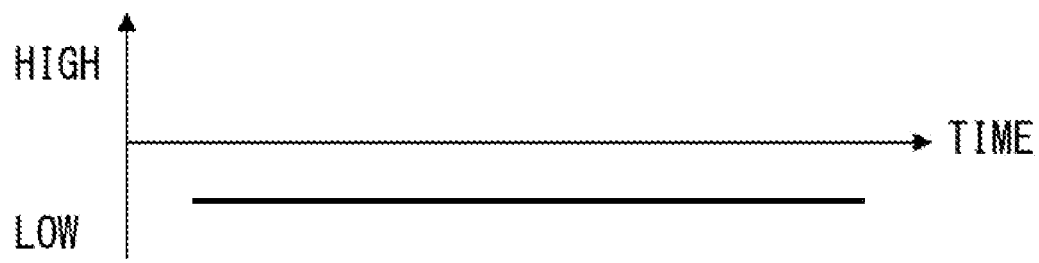
F I G. 27 A

US 8,126,331 B2

WAVELENGTH DIVISION MULTIPLEXING TRANSMISSION DEVICE AND WAVELENGTH DIVISION MULTIPLEXING TRANSMISSION METHOD

CROSS-REFERENCE TO RELATED APPLICATIONS

This application is based upon and claims the benefit of priority of the prior Japanese Patent Application No. 2008-317044, filed on Dec. 12, 2008, the entire contents of which are incorporated herein by reference.

FIELD

The present invention relates to a wavelength division multiplexing device, a wavelength division multiplexing transmission method, and a wavelength selection switch.

BACKGROUND

With increasing communication traffic, a large number of transmission networks have been configured on the basis of wavelength division multiplexing technology in a long hole area, a metro area, and an access area by a user. To configure a flexible optical transmission network, an optical add-drop multiplexer (OADM) capable of passing through, adding or dropping a node in an optical wavelength unit is demanded.

In an optical add-drop multiplexer, a terminal station device, a relay device, etc., a level adjustment is performed for each wavelength by monitoring a wavelength division multiplexed signal to realize a long distance transmission.

An optical add-drop multiplexer has a wavelength selection switch (WSS) for adjusting the level of an optical signal of each wavelength. The wavelength selection switch demultiplexes wavelength division multiplexed light into each wavelength by a demultiplexer, and selects passage of a thru signal or an add signal by an optical switch. After the attenuation by a variable optical attenuator (VOA), a multiplexer performs a wavelength division multiplexing operation. The level of the wavelength division multiplexed signal is monitored by an optical channel monitor (OCM), and the amount of attenuation of the variable optical attenuator is controlled so that the signal of each wavelength can reach a target level.

As a wavelength selection switch, a micro electro mechanical system (MEMS) has become dominant because of its advantage in signal transmission band characteristic, loss, and polarization dependence.

To reduce the entire cost in the optical add-drop multiplexer, the monitoring process on the input side of the device is omitted, the optical signal level of each wavelength is monitored in the subsequent stage of the wavelength selection switch, and the amount of attenuation is controlled.

FIG. 15 illustrates a configuration of a wavelength selection switch 11 using a MEMS. The wavelength selection switch 11 includes a collimator 12, a grating 13, a lens 14, and an MEMS mirror 15.

The light input from each of input ports 2 through 4 is converted by a collimator 12 into spatial light, and demultiplexed by the grating 13 into light of each wavelength. The demultiplexed light is condensed by the lens 14, and amount of attenuation of the light of each wavelength is controlled by the MEMS mirror 15 and output to an output port 1. The MEMS mirror 15 has a mirror for each demultiplexed wavelength, and each mirror is arranged orthogonal (direction x in FIG. 15) to the array direction (direction y in FIG. 15) of the ports 1 through 4.

FIG. 16 illustrates a controlling operation of the wavelength selection switch 11 of the related art. FIG. 16 illustrates an optical coupler (CPL) 21, an optical channel monitor (OCM) 22, and a control unit 23.

The optical coupler (CPL) 21 branches the output light of the output port 1 and outputs the light to the optical channel monitor 22. The optical channel monitor 22 monitors the optical signal level of each wavelength. The control unit 23 controls the angle of the MEMS mirror 15 depending on the detection level of the optical channel monitor 22.

For example, the optical signal of the ch 16 of the input port 4 is output to the port 1, the control unit 23 controls the angle of the mirror corresponding to a channel ch 16 of the MEMS mirror 15 so that the signal level of the output port 1 can be a desired value. The mirror is provided for each channel, and looks overlapping actually in the position of the ch 16 with reference to FIG. 15.

FIGS. 17A and 17B are explanatory views of the control direction of the MEMS mirror 15. FIG. 17A is an example of the case in which the angle of the MEMS mirror 15 is controlled in the array direction (direction y) of the port. FIG. 17B is an example of the case in which the angle of the MEMS mirror 15 is controlled in the direction (direction x) orthogonal to the array direction of the port for attenuation.

The optical path a indicated by broken lines in FIG. 17A is an optical path when the angle of the MEMS mirror 15 is changed in the direction y. By adjusting the angle of the MEMS mirror 15, the amount of the light input to the output port 1 can be increased or decreased to control the amount of attenuation.

Since there is the possibility in this control method that light leaks (cross talk) to an adjacent port when the amount of shift of the optical axis is increased to increase the amount of attenuation, it is necessary to increase the distance between ports to be equal to or larger than a predetermined value, thereby causing the problem that the entire device becomes large. In addition, when the angle of the mirror is controlled in the array direction of ports, the angle control tolerance (allowance of the angle control) of the MEMS mirror 15 becomes low, it is necessary to control the amount of attenuation of the MEMS mirror 15, that is, the angle of the mirror, with high accuracy.

FIG. 17B is a top view from the arrow direction in FIG. 17A. When the angle of the MEMS mirror 15 is controlled so that it can be orthogonal to the array direction of the ports 1 through 4, the light does not leak to the adjacent port although the angle is expanded. Therefore, there occurs no problem of cross talk, but there occurs another problem that the transmission band characteristic of a signal is degraded.

The degradation of a transmission band characteristic is described in the patent document 3 as follows. That is, since the amount of reducing the reflected light beam from the vicinity of the end surface of a mirror (movable reflecting object) increases, the influence of diffraction becomes outstanding, thereby indicating an inverted trapezoidal amount of attenuation to band characteristic. As a result, the amount of attenuation to band characteristic of the reflected light of a mirror does not indicate a trapezoidal shape, but indicates a substantially M shape referring to an increased amount of attenuation in a certain wavelength band, thus degrading the transmission band characteristic.

Described below concretely is the control method of the MEMS mirror 15. FIG. 18 is a boot-up sequence. FIG. 18 is an example of the case in which the angle of the MEMS mirror 15 is controlled in the array direction of the port during the boot-up.

When the optical input level is equal to or lower than the threshold (S11 in FIG. 18), the angle of the MEMS mirror 15 is adjusted in the direction of the ports so that the fixed amount of attenuation can be assigned (S12). The fixed amount of attenuation is set in step S12 for the following reason. That is, if feedback control is performed when the optical input level is equal to or lower than the threshold, the amount of attenuation reaches the minimum value when the optical input level is low. If an optical signal at a normal level is input in this state, a very high optical signal is output at a subsequent stage. Therefore, there is the possibility that optical parts at the subsequent stage can be destroyed.

If the optical input level reaches the normal level (S13), and the optical channel monitor (OCM) 22 of the output port detects that the optical input level has exceeded the threshold (S14), then the feedback control of the amount of attenuation is started (S15). In the feedback control, the angle of the MEMS mirror 15 is adjusted in the direction y on the basis of the optical signal level detected by the optical channel monitor 22, and the amount of attenuation is controlled (S16). If the optical signal level detected by the optical channel monitor has reached a desired level, the operation is started (S17).

FIGS. 19A and 19B illustrate the operation of controlling a wavelength selection switch. FIGS. 19A and 19B are examples of the case in which the angle of the MEMS mirror 15 is controlled in the array direction of ports.

A wavelength division multiplexed optical signal is output from the ports 2 through 4, but the case in which an optical signal of the channel ch 16 of the port 4 is output to the port 1 is described below for simple explanation.

When the optical input level is higher than the threshold, the angle of mirror corresponding to the channel 16 of the MEMS mirror 15 is feedback-controlled for the light of the wavelength of the channel ch 16 input from the input port 4, and the light attenuated by an appropriate amount of attenuation is input to the port 1. In this case, the light of the channel ch 16 of the ports 2 and 3 is also reflected by the MEMS mirror 15, but the light is not input to the port 1.

When the optical signal is disconnected and the optical input level drops to the threshold or lower, the angle of the mirror corresponding to the channel ch 16 of the MEMS mirror 15 is controlled in the array direction of the ports by the fixed amount of attenuation as illustrated in FIG. 19B. In this case, since the amount of attenuation is large, and the angle of the mirror is also large, there is the possibility that the light of the channel ch 16 of the port 3 enters the output port 1 and the cross talk occurs.

FIG. 20 illustrates an optical coupling image for the output port. In FIG. 20, the white circles indicate the positions of the ports 1 through 4, and the black or gray circles indicate the positions of the reflected light of the MEMS mirror 15.

When the MEMS mirror 15 is controlled in the port direction by the fixed amount of attenuation, the reflected light a' of the port 3 enters the output port 1 as illustrated in FIG. 20, and the cross talk can occur.

Since the angle of the MEMS mirror 15 is controlled in the array direction of the ports by the fixed amount of attenuation in the above-mentioned control method, there is the possibility that the cross talk occurs during operation.

FIG. 21 illustrates another boot-up sequence. In this example, the angle of the MEMS mirror 15 is controlled in the direction orthogonal to the array direction of the ports.

When the optical input level is equal to or lower than the threshold (S21 in FIG. 21), the control unit 23 controls the MEMS mirror 15 in the direction orthogonal to the array direction of the ports (spectral direction) to assign the fixed amount of attenuation (S22).

If an optical signal at the normal level is input (S23), the optical channel monitor 22 detects the optical signal level of each channel (S24). Then, the feedback control is started depending on the optical signal level detected by the optical channel monitor 22 (S25).

If the feedback control is started, the MEMS mirror 15 is controlled in the direction orthogonal to the array direction of the ports (direction x in FIG. 16) so that the optical signal level of the output port can reach a desired level. If the desired level is reached, the operation is started (S27).

FIGS. 22A and 22B illustrate the controlling operation of the wavelength selection switch. Described below is the case in which the optical signal of the channel ch 16 of the port 4 is output to the port 1.

When the optical input level is higher than the threshold, the angle of the mirror corresponding to the channel ch 16 of the MEMS mirror 15 is feedback-controlled in the direction orthogonal to the array direction of the ports (direction x) as illustrated in FIG. 22A. In this case, the light of the channel ch 16 of the ports 2 and 3 is also reflected by the same mirror of the MEMS mirror 15. However, since the angle of the MEMS mirror 15 is controlled in the direction x, the light output from the port 3 does not enter the port 1.

When the optical input level is equal to or lower than the threshold, the angle of the MEMS mirror 15 is controlled so that a large fixed amount of attenuation can be assigned. In this case, since the MEMS mirror 15 is controlled in the direction orthogonal to the array direction of the ports as illustrated in FIG. 22B, the light of other ports does not enter the output port 1. In this process, no cross talk occurs, but the transmission band characteristic is degraded during the operation.

FIG. 23 illustrates the optical coupling image for the output port. In FIG. 23, the white circles indicate the positions of the respective ports 1 through 4, and the black or gray circles indicate the positions of the reflected light of the MEMS mirror 15.

When the MEMS mirror 15 is controlled in the direction orthogonal to the array direction of the ports (direction x) by the fixed amount of attenuation, the light of other ports does not enter the output port 1 as illustrated in FIG. 23, and therefore no cross talk occurs.

Since the angle of the MEMS mirror 15 is controlled in the direction orthogonal to the array direction by the fixed amount of attenuation in the above-mentioned control method, no cross talk occurs, but the transmission band is degraded in the operation when the optical signal level exceeds the threshold.

FIG. 24 is an explanatory view of the degradation of the transmission band. FIG. 24 indicates the relationship among the frequency, the amount of relative attenuation, and the amount of attenuation of the MEMS mirror 15. The horizontal axis indicates the optical frequency, and the vertical axis indicates the relative attenuation value. 1.934×E+14 refers to $1{,}934 \times 10^{14}$ (193.4 [THz]), which indicates that the band degradation in an ear-shaped form occurs on the right and left of the transmission band together with the amount of attenuation.

When the angle of the MEMS mirror 15 is controlled in the direction orthogonal to the array direction of the ports (spectral direction), the transmission band of the wavelength selection switch 11 is degraded the further as the larger amount of attenuation is assigned.

FIG. 25 is an explanatory view of the degradation of a transmission signal. The horizontal axis indicates an optical frequency and the vertical axis indicates a relative attenuation value [dB]. When the angle of the MEMS mirror 15 is control device in the spectral direction, in a ring network in which a plurality of optical add-drop multiplexers (OADM) are connected in a ring form, a signal is degraded each time the signal passes through each optical add-drop multiplexer. FIG. 25 illustrates the number of spans of the optical add-drop multiplexers through which the optical signal passes and the state of the degradation of the signal.

FIG. 26 is an explanatory view of a Q penalty. A Q penalty refers to a value indicating the degradation of signal quality by band degradation as compared with the case in which no band degradation occurs (Ear=0 dB). FIG. 26 illustrates the relationship between the number of spans indicating the number of optical add-drop multiplexers through which an optical signal passes, Q penalty and the amount of band degradation (size of ear in FIG. 24). As illustrated in FIG. 26, the larger the degradation (ear) or the larger the number of spans, the higher the value of the Q penalty.

FIGS. 27A and 27B illustrate the transmission band characteristic and the mirror control tolerance in the above-mentioned control method.

The method of controlling the angle of the MEMS mirror 15 in the array direction of the ports (direction y) is good in transmission band characteristic both during boot-up and operation (normal operation) as illustrated in FIG. 27A. However, the angle control tolerance of a mirror is low during both boot-up and operation.

The method of controlling the angle of the MEMS mirror 15 in the direction orthogonal to the array direction of the ports (direction x) is high in the angle control tolerance of a mirror is low both during boot-up and operation (normal operation) as illustrated in FIG. 27B. However, the transmission band characteristic is low during both boot-up and operation.

The patent document 1 discloses monitoring the optical power of each channel by a channel monitor monitoring the light reflected by the end surface of the output port of a wavelength selection switch and returned to the input port.

The patent document 2 discloses a wavelength selection switch including a VIPA for holding outputting the wavelength division multiplexed light A and B at the output angle depending on the wavelength, and a focus lens for condensing the light A and B on one point of the micromirror in a micromirror array.

[Patent Document 1] Japanese Laid-open Patent Publication No. 2006-243571

[Patent Document 2] Japanese Laid-open Patent Publication No. 2004-258409

[Patent Document 3] Japanese Laid-open Patent Publication No. 2006-133336

SUMMARY

The wavelength division multiplexing transmission device according to the present invention includes: a plurality of ports where a wavelength division multiplexed optical signal is input or output; a wavelength demultiplexing unit for demultiplexing the wavelength division multiplexed optical signal; an attenuation unit for controlling a coupling direction for the ports of a wavelength demultiplexed optical signal of each wavelength and controlling an amount of attenuation; a detection unit for detecting a power level of an optical signal at an output terminal; and a control unit for controlling the coupling direction of the attenuation unit in a direction orthogonal to an array direction of the ports when the detection unit detects that the power level of the optical signal reaches a first threshold or lower, and controlling the coupling direction of the attenuation unit in the array direction of the ports when the detection unit detects that the power level of the optical signal exceeds a second threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view (2) of a controlling operation of a wavelength selection switch according to the first embodiment of the present invention;

FIG. 8 is a view (2) of a controlling operation of a wavelength selection switch according to the second embodiment of the present invention;

FIG. 12 illustrates an optical coupling image for an output port according to the third embodiment of the present invention;

FIG. 13 illustrates a controlling operation according to the fourth embodiment of the present invention;

FIG. 15 illustrates a configuration of the wavelength selection switch using a MEMS mirror;

FIG. 20 illustrates an optical coupling image for the output port;

FIG. 21 illustrates a boot-up sequence;

FIG. 23 illustrates an optical coupling image for the output port;

FIG. 24 is an explanatory view of the degradation of a transmission band characteristic;

FIG. 26 is an explanatory view of a Q penalty; and

DESCRIPTION OF EMBODIMENTS

Figure 1:
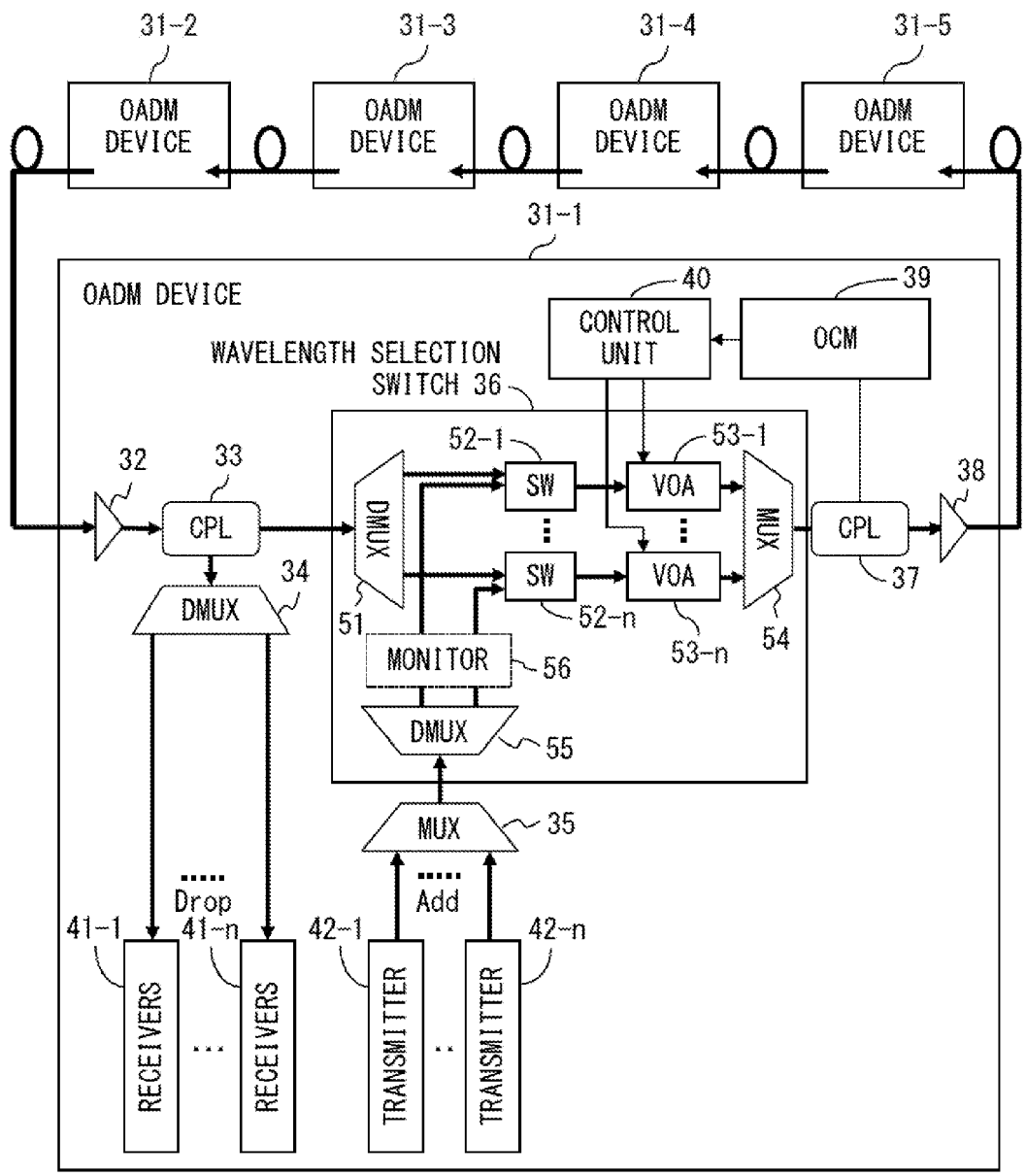
FIG. 1 illustrates a ring network according to an embodiment of the present invention.

Described below are preferable embodiments of the present invention. FIG. 1 is an example of a ring network in which a wavelength division multiplexed optical signal is transmitted according to an embodiment of the present invention.

A plurality of OADM (optical add drop multiplexer) devices 31-1, 31-2 ... 31-n are connected to the ring network.

The OADM device 31-1 includes an optical amplifier 32 at the input terminal, an optical coupler (CPL) 33, a wavelength demultiplexer (DMUX) 34, a wavelength division multiplexer (MUX) 35, a wavelength selection switch 36, an optical coupler 37 at the output terminal, an optical amplifier 38, an optical channel monitor (OCM) 39, and a control unit 40. Receivers 41-1 through 41-n are connected to the wavelength demultiplexer 34, and transmitters 42-1 through 42-n are connected to the wavelength division multiplexer 35.

An optical signal transmitted in the ring network is amplified by the optical amplifier 32, divided by the optical coupler 33, and output to the wavelength demultiplexer and the wavelength selection switch 36. The wavelength selection switch 36 selects one of the optical signal transmitted in the ring network and the optical signal output from the wavelength division multiplexer 35, adjusts the amount of attenuation so that the optical signal of each wavelength can reach a desired power level and outputs the resultant signal.

Figure 3A:
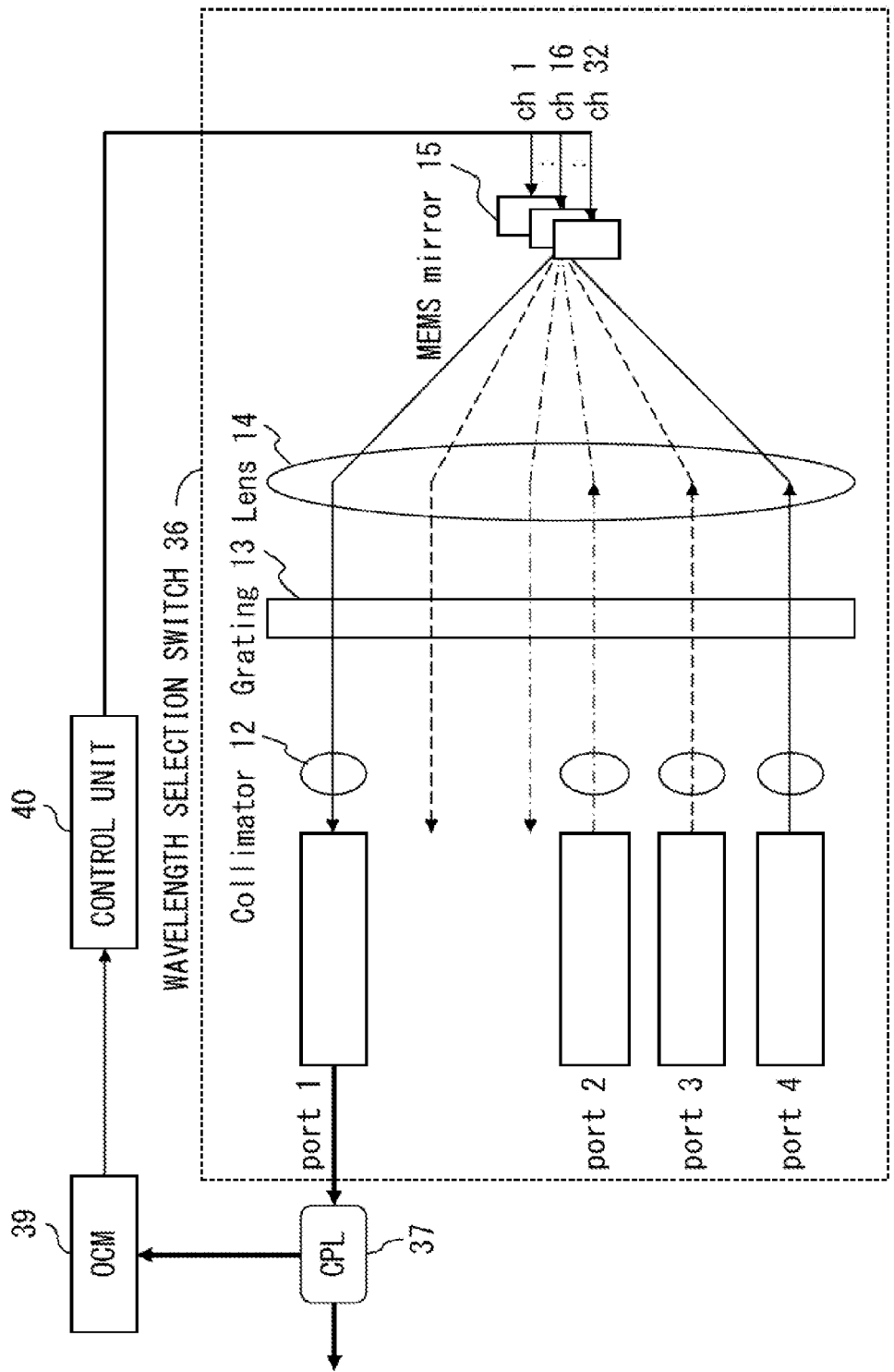
FIG. 3 is a view (1) of a controlling operation of a wavelength selection switch according to the first embodiment of the present invention.

The wavelength selection switch 36 includes a wavelength demultiplexer 51, a plurality of switches 52-1 through 52-n, variable optical attenuators (VOA) 53-1 through 53-n, a wavelength division multiplexer (MUX) 54, and a wavelength demultiplexer 55. The switches 52-1 through 52-n, the switches 52-1 through 52-n, the variable optical attenuators 53-1 through 53-n, etc. of the wavelength selection switch 36 in FIG. 1 indicate the functions of the wavelength selection switch 36. In the embodiments of the present invention, the wavelength selection switch 36 having the collimator 12, the grating 13, the lens 14, and the MEMS mirror 15 illustrated in FIG. 3A is used as an example of a practical configuration.

A monitor 56 for monitoring the optical signal of each channel can be provided at the subsequent stage of the wavelength demultiplexer 55. However, to reduce the cost, the monitor at the input terminal of the device is omitted, and the power level of each wavelength is monitored at the subsequent stage of the WSS, the amount of attenuation is controlled on each channel in the WSS, and the power level can be averaged (or a target power level can be attained for each channel) by the output of the device (Japanese Patent No. 3954072).

The wavelength demultiplexer 51 demultiplexes a wavelength division multiplexed optical signal into optical signals of the respective wavelength channels. The switches 52-1 through 52-n select and output one of the optical signals of a plurality of channels output from the wavelength demultiplexer 51 and the add signals of a plurality of channels output from the wavelength demultiplexer 55. The variable optical attenuators 53-1 through 53-n adjust the amount of attenuation so that the optical signal of each channel can reach a desired power level. The wavelength division multiplexer 54 outputs the optical signal of each wavelength to the optical coupler 37.

The optical channel monitor 39 monitors the optical signal power level of each channel of the optical signal branched by the optical coupler 37. The control unit 40 controls the amount of attenuation of the variable optical attenuators 53-1 through 53-n so that the optical signal of each wavelength can reach a desired power level.

Figure 16:
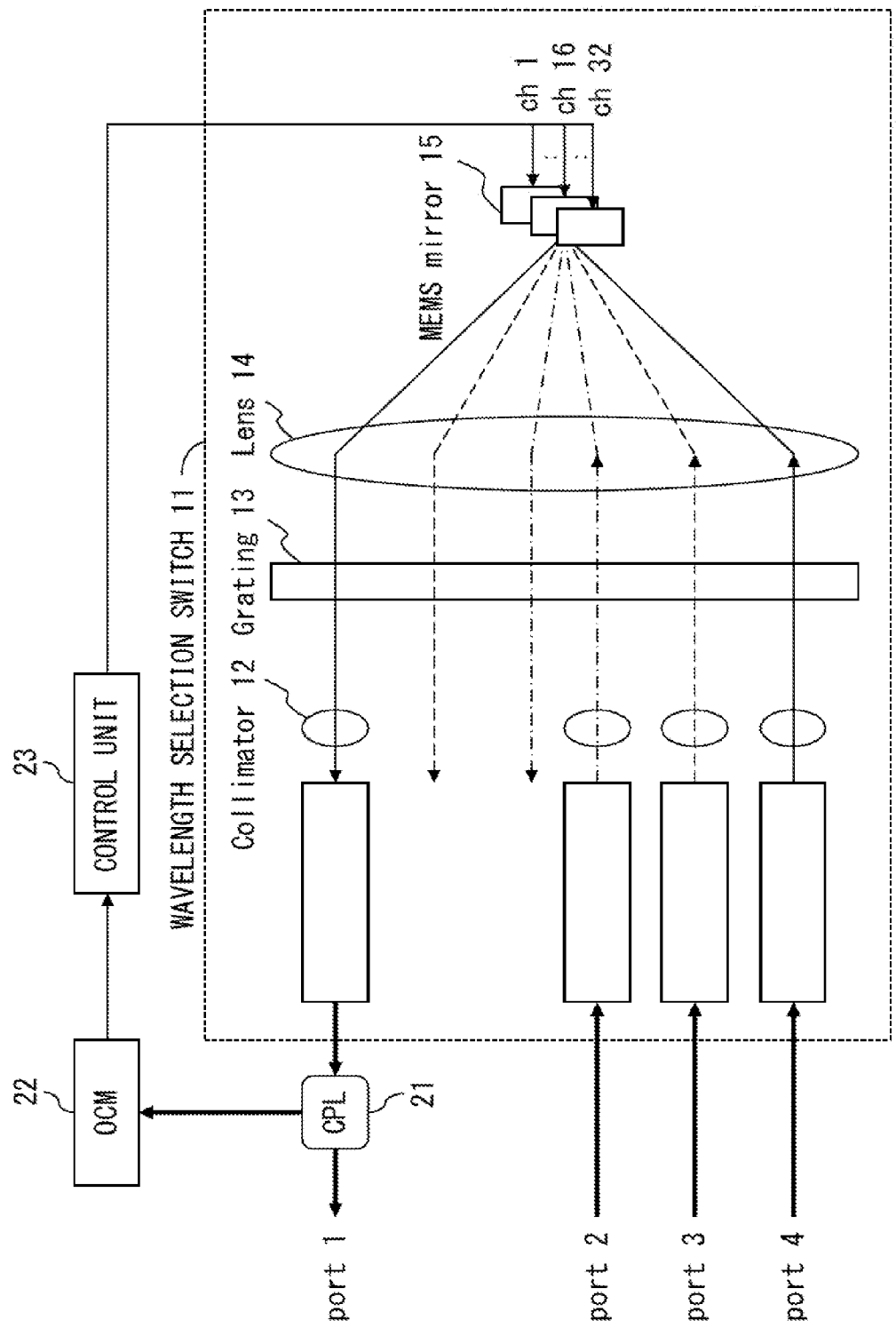
FIG. 16 illustrates a controlling operation of a wavelength selection switch.
Figure 17A:
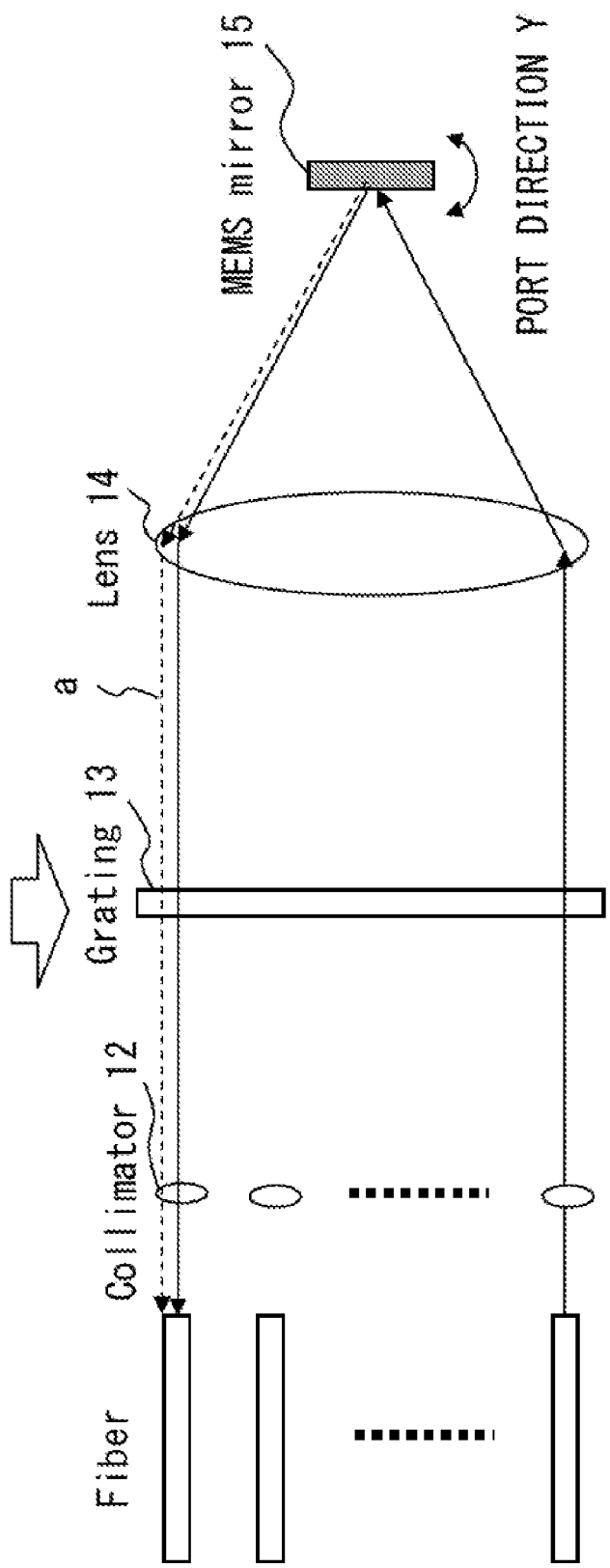
FIG. 17 is an explanatory view of a control direction of the MEMS mirror.
Figure 17B:
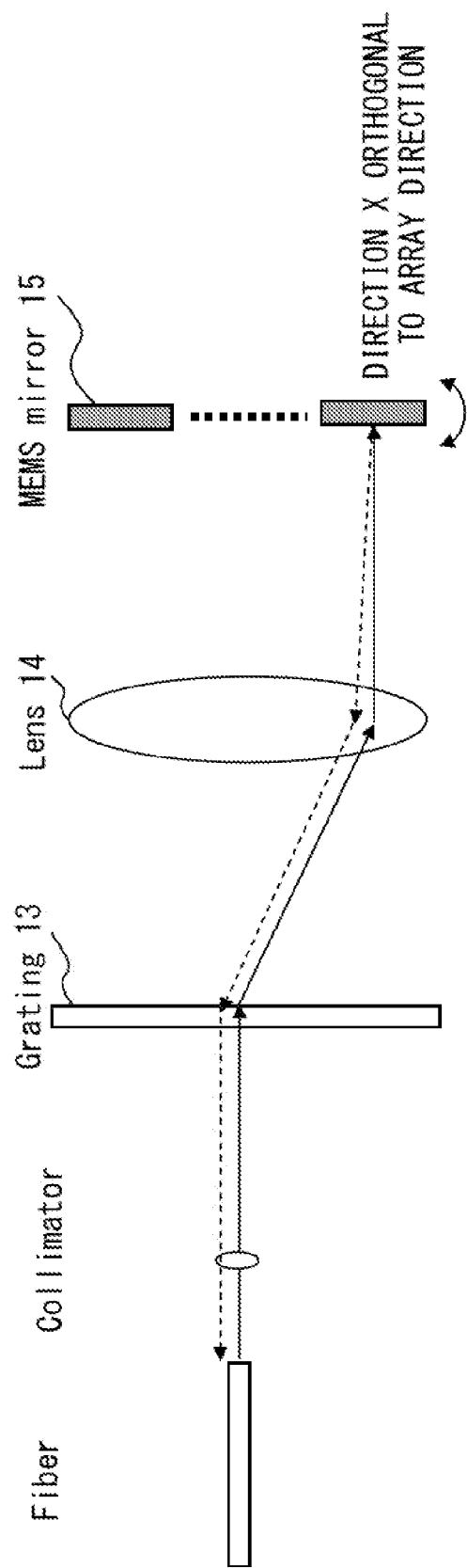
Figure 18:
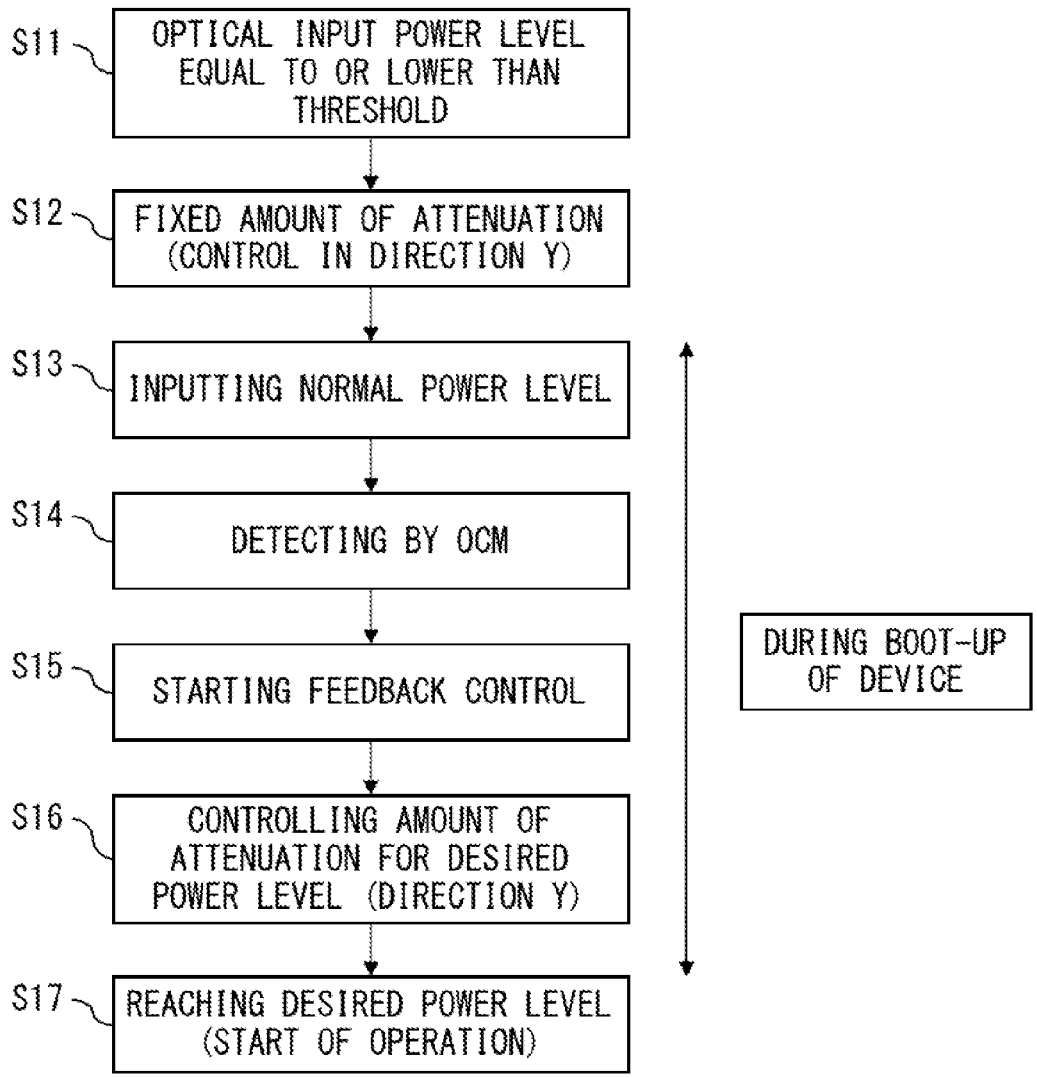
FIG. 18 illustrates a boot-up sequence.
Figure 19A:
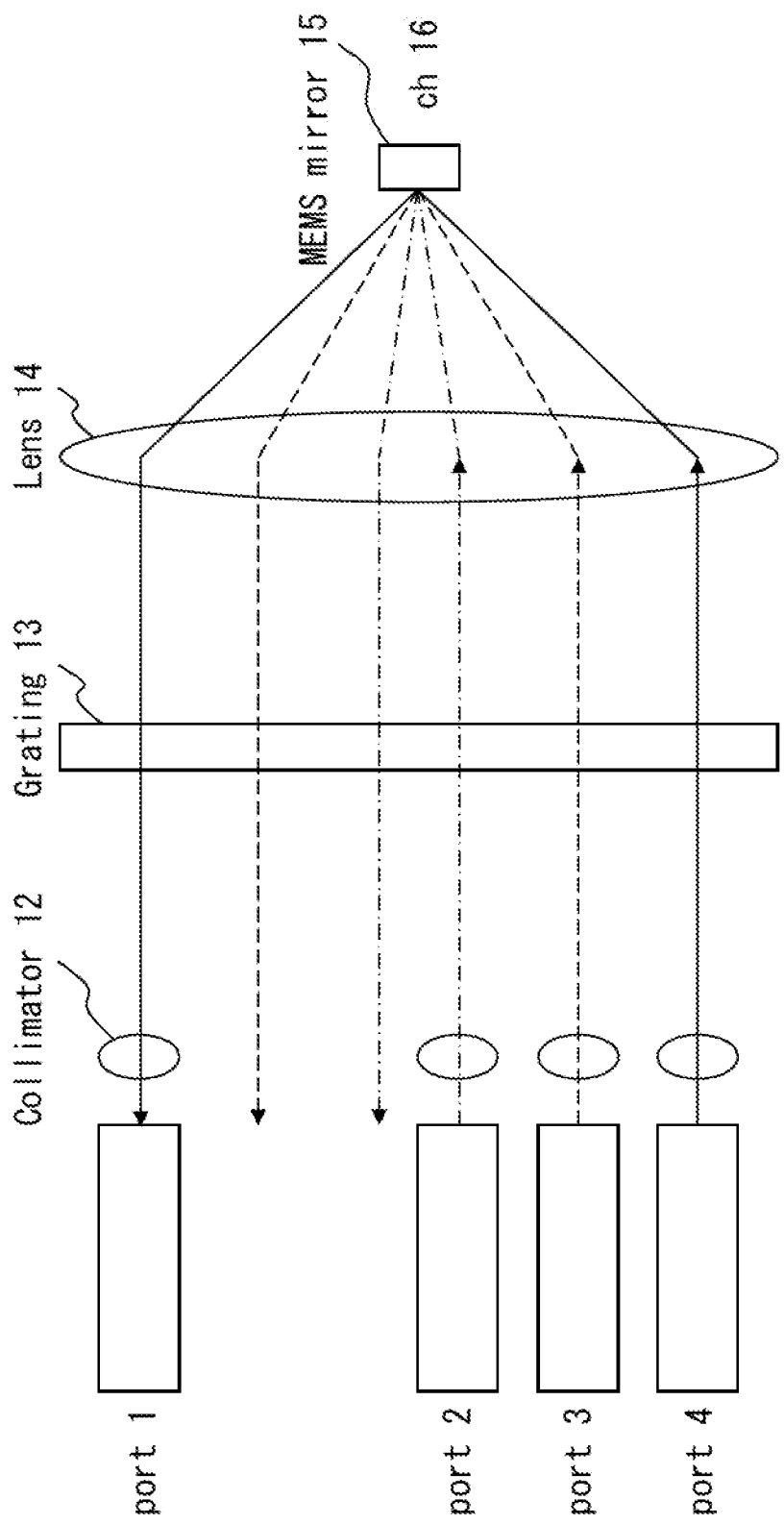
FIG. 19 illustrates a controlling operation of a wavelength selection switch.
Figure 22B:
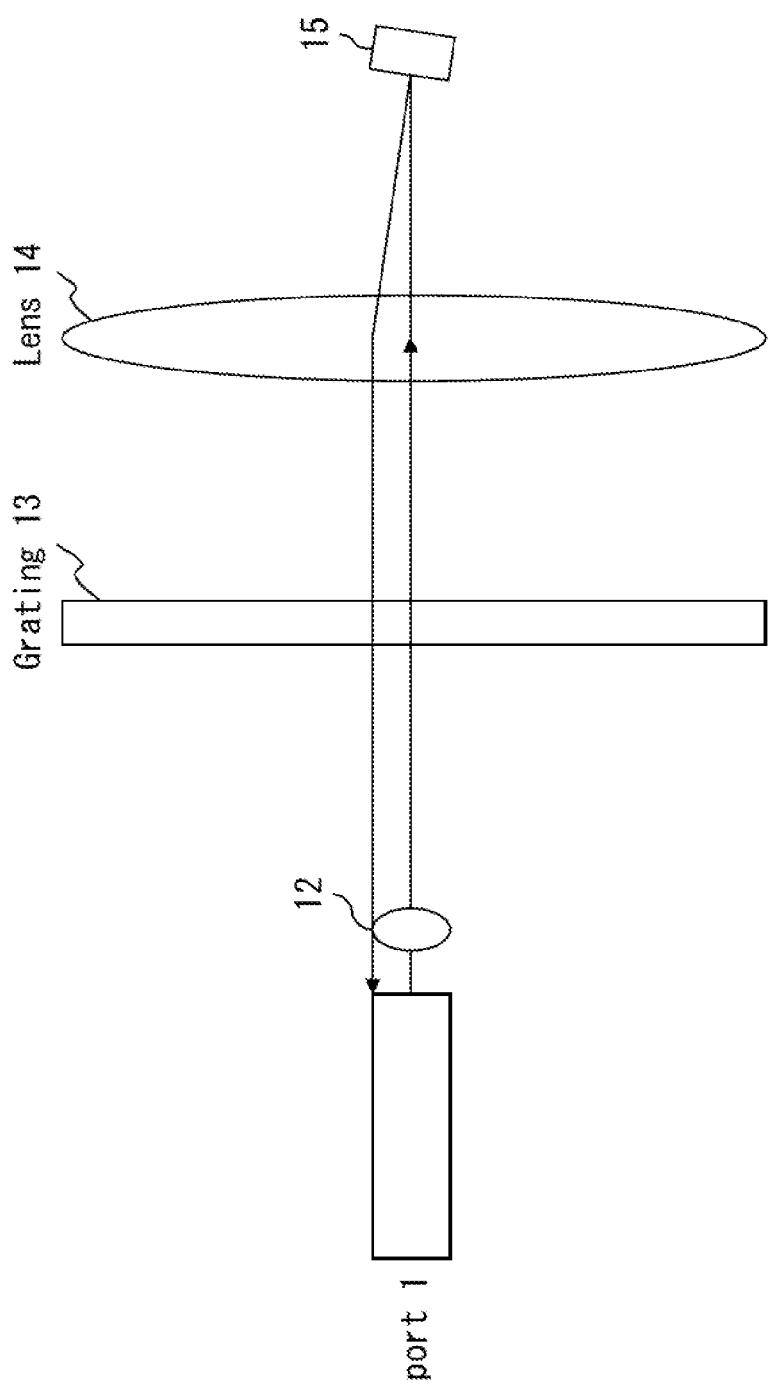
FIG. 22 illustrates a controlling operation of a wavelength selection switch.
Figure 25:
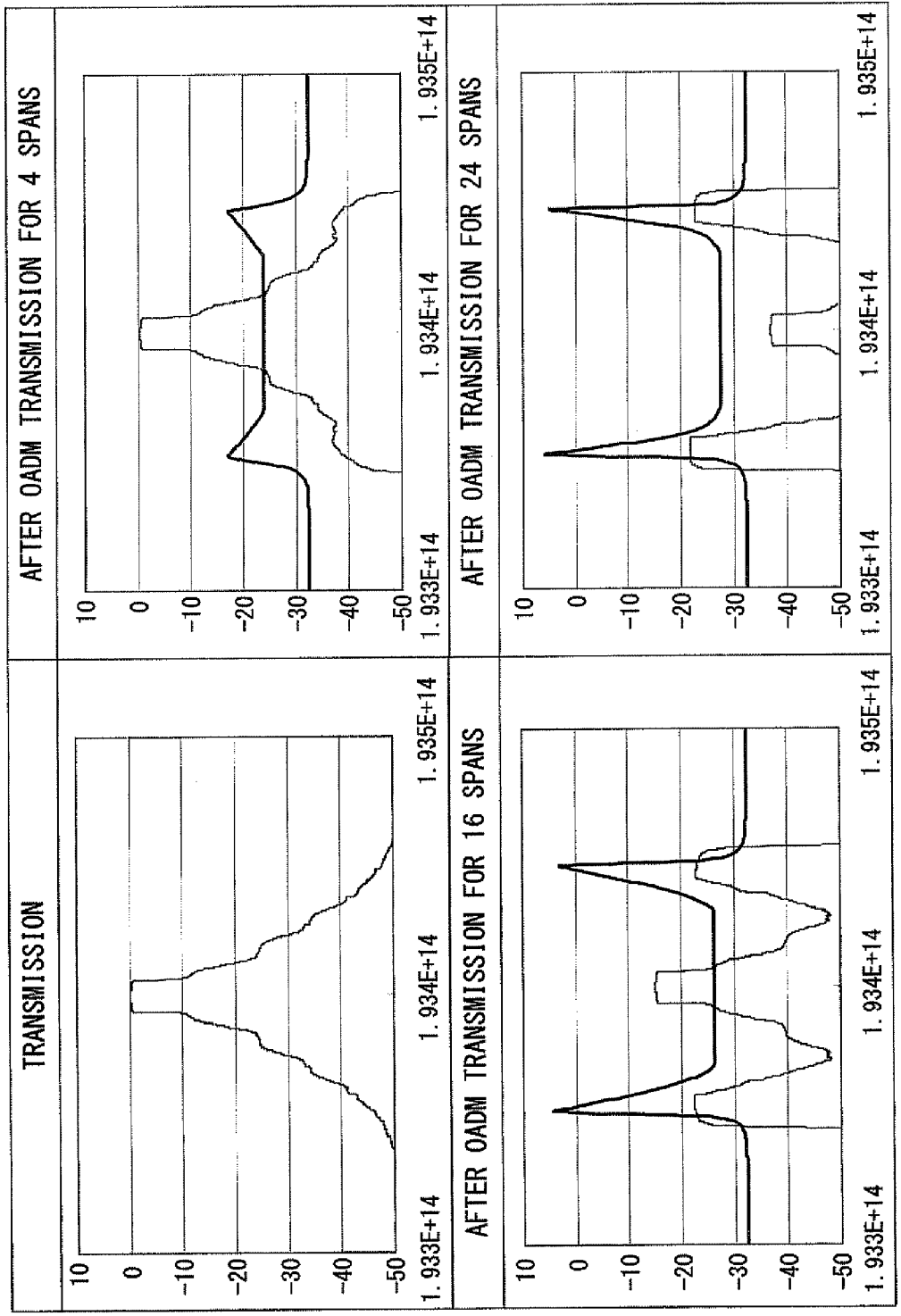
FIG. 25 is an explanatory view of the degradation of a transmission signal.
Figure 27B:
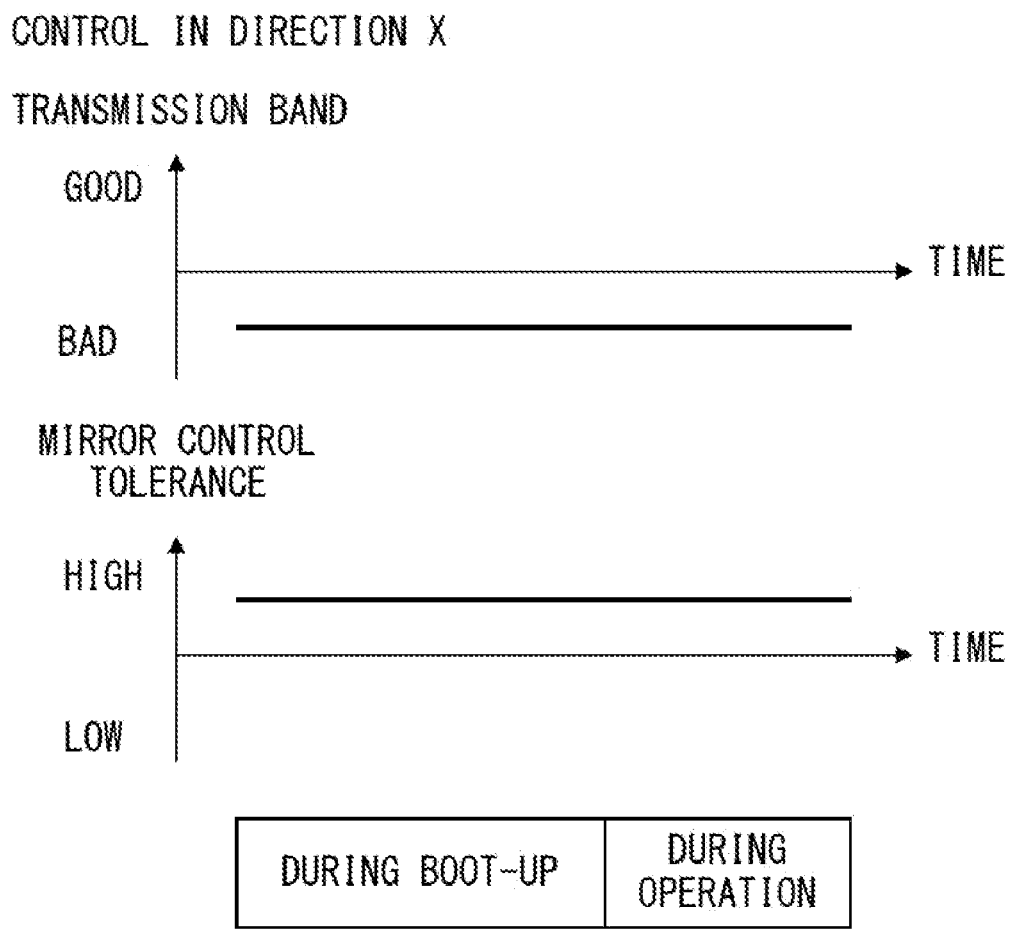
FIG. 27 illustrates a transmission band characteristic and a mirror control tolerance.

The internal configuration of the wavelength selection switch 36 in FIG. 1 is expressed by a block diagram for realizing the functions, and includes the wavelength selection switch 11 having the collimator 12, the grating 13, the lens 14, and the MEMS mirror 15 in FIG. 16 in an embodiment of the present invention.

Described below is the operation of the wavelength selection switch 36 and the control unit 40 when the optical signal power level input to the OADM device 31-1 is equal to or lower than the threshold, and then an optical signal at a normal power level is input.

Figure 2:
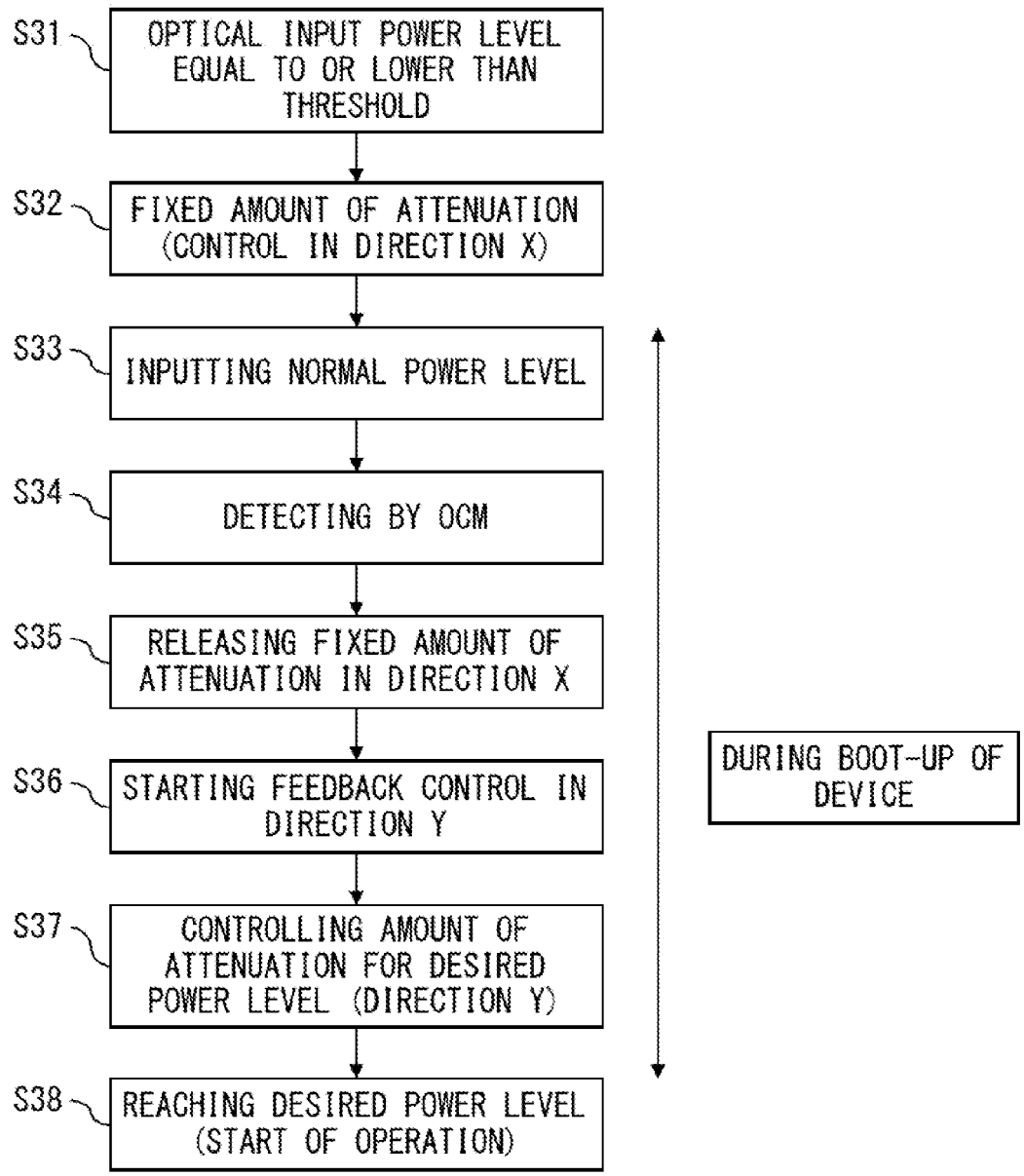
FIG. 2 illustrates a boot-up sequence according to the first embodiment of the present invention.

FIG. 2 illustrates a boot-up sequence of the wavelength selection switch 36 according to the first embodiment of the present invention. A boot-up sequence refers to the process of adjusting the amount of attenuation by the MEMS mirror 15 from the state in which the optical signal power level is equal to or lower than the threshold to the state in which the desired power level is reached.

When the optical channel monitor 39 detects that the optical signal power level (optical input power level) has become or fallen below the threshold (S31 in FIG. 2), the control unit 40 controls the angle of the MEMS mirror 15 in the direction x by a fixed amount of attenuation. The direction x refers to a direction orthogonal to the array direction of the ports 1 through 4 in FIG. 15.

When an optical signal at a normal power level is input to the wavelength selection switch 36 (S33), the optical channel monitor 39 detects that the optical signal power level of a corresponding wavelength exceeds the threshold (S34).

When it is detected that the optical signal power level exceeds the threshold, the control unit 40 releases the fixed amount of attenuation of a corresponding channel, that is, stops the control of the MEMS mirror 15 in the direction x (S35). Then, the control unit 40 starts the feedback control in the direction y (array direction of the ports) on the MEMS mirror 15 (S36). Next, the angle of the mirror of the corresponding channel of the MEMS mirror 15, that is, the amount of attenuation, is controlled so that the optical signal power level of each channel detected by the optical channel monitor 39 can reach a desired power level (S37). If the optical signal power level detected by the optical channel monitor 39 has reached the desired power level, then the operation of the corresponding channel is started. The control is performed on each channel.

In the processes in steps S34 through S37, the control direction of the MEMS mirror 15 is switched from the direction orthogonal to the array direction of the ports 1 through 4 to the array direction of the ports 1 through 4 when the optical channel monitor 39 detects that the optical signal power level of any channel has exceeded the threshold. The sequence in steps S33 through S38 is the process performed during the boot-up of the optical add-drop multiplexer 31-1.

FIGS. 3 and 4 illustrate the controlling operation of the wavelength selection switch 36 according to the first embodiment of the present invention.

As illustrated in FIG. 3A, the wavelength selection switch 36 includes the collimator 12, the grating 13, the lens 14, and the MEMS mirror 15. The collimator 12, the grating 13, and the lens 14 respectively correspond to, for example, the wavelength demultiplexer 51 and the wavelength division multiplexer 54 in FIG. 1, and the MEMS mirror 15 corresponds to the switches 52-1 through 52-n and the variable optical attenuators 53-1 through 53-n.

The optical signal output from each port (for example, the port 1) of the wavelength selection switch 36 is branched by the optical coupler (OPL) 37, and output to the optical channel monitor (OCM) 39, and the optical channel monitor 39 monitors the optical signal power level of each wavelength. The control unit 40 controls the angle of the MEMS mirror 15 depending on the detection power level of the optical channel monitor 39. In the drawings illustrated in and after FIG. 3A, the optical coupler 37, the optical channel monitor 39, and the control unit 40 are omitted.

Figure 3B:
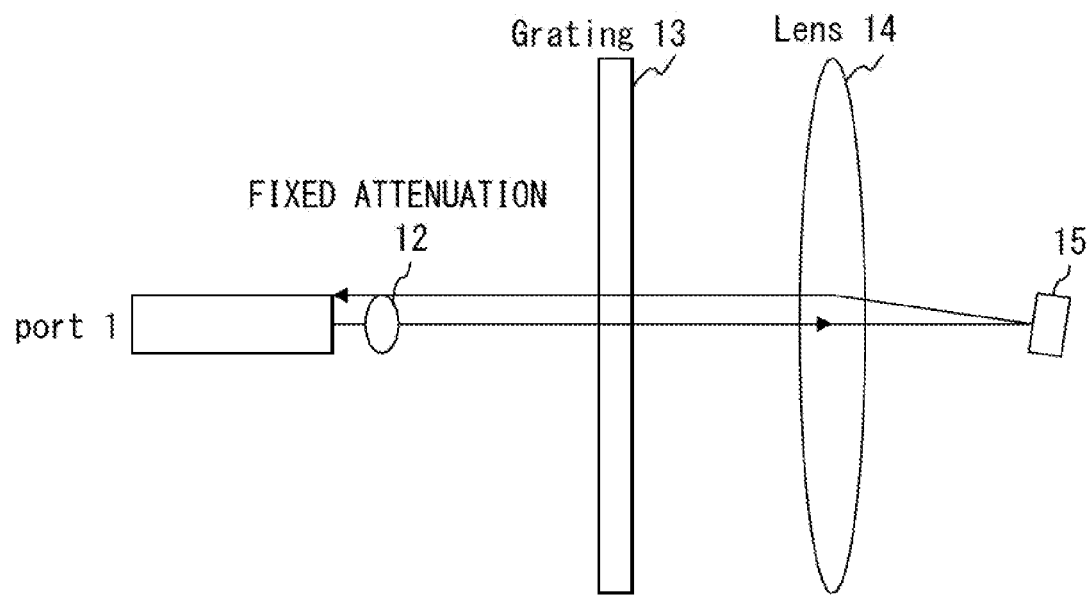

FIG. 3A illustrates the surface of the ports 1 through 4 arranged in an array and viewed from above. FIG. 3B illustrates a port viewed from the array direction. In FIG. 3A, the MEMS mirror 15 is provided for each channel in the direction orthogonal to the surface of the sheet.

Described below for simple explanation is the case in which the optical signal of the channel ch 16 of the port 4 is output to the port 1. When the optical signal power level detected by the optical channel monitor 39 reaches the threshold or lower, the control unit 40 controls the angle of the mirror of the corresponding channel of the MEMS mirror 15 in the direction orthogonal to the array direction of the ports 1 through 4 (spectral direction) so that a predetermined amount of attenuation can be attained.

FIGS. 3A and 3B illustrate the coupling direction for the output port of the light reflected by the MEMS mirror 15. The port 4 is arranged in the direction orthogonal to the surface of the sheet of the port 1 in FIG. 3B, and the light output from the port 4 is reflected by the MEMS mirror 15 and enters the output port 1.

In this case, since the angle of the MEMS mirror 15 is controlled in the direction orthogonal to the array direction of the ports 1 through 4, the light reflected by the MEMS mirror 15 enters the position apart from the output port 1. Therefore, there is a small possibility of the occurrence of cross talk.

FIGS. 4A and 4B illustrate the controlling operation of the wavelength selection switch according to the first embodiment. FIG. 4A illustrates the coupling direction of the light reflected by the MEMS mirror 15 when the fixed amount of attenuation in the direction x is set to 0.

When the fixed amount of attenuation is 0, the angle of the direction x of the MEMS mirror 15 is substantially 0. The light output from the port 4 arranged on the reverse of the sheet in FIG. 4 is reflected by the MEMS mirror 15 and enters the output port 1.

FIG. 4B illustrates the path of the incident light and the reflected light when the feedback control in the array direction of the ports 1 through 4 is started.

When the feedback control is started, the power level of the optical signal is close to a target signal power level. Therefore, it is not necessary to keep a large angle of the MEMS mirror 15 in the direction y. Accordingly, the reflected light input from the input ports 2 and 3 and reflected by the MEMS mirror 15 enters the position apart from the output port 1. Therefore, the reflected light of the ports 2 and 3 does not leak to the output port 1, thereby incurring a small possibility of the occurrence of cross talk. In this case, since the angle of the MEMS mirror 15 is controlled in the array direction of the ports 1 through 4, the transmission band characteristic of the wavelength selection switch 36 during the operation is not degraded.

Figure 5:
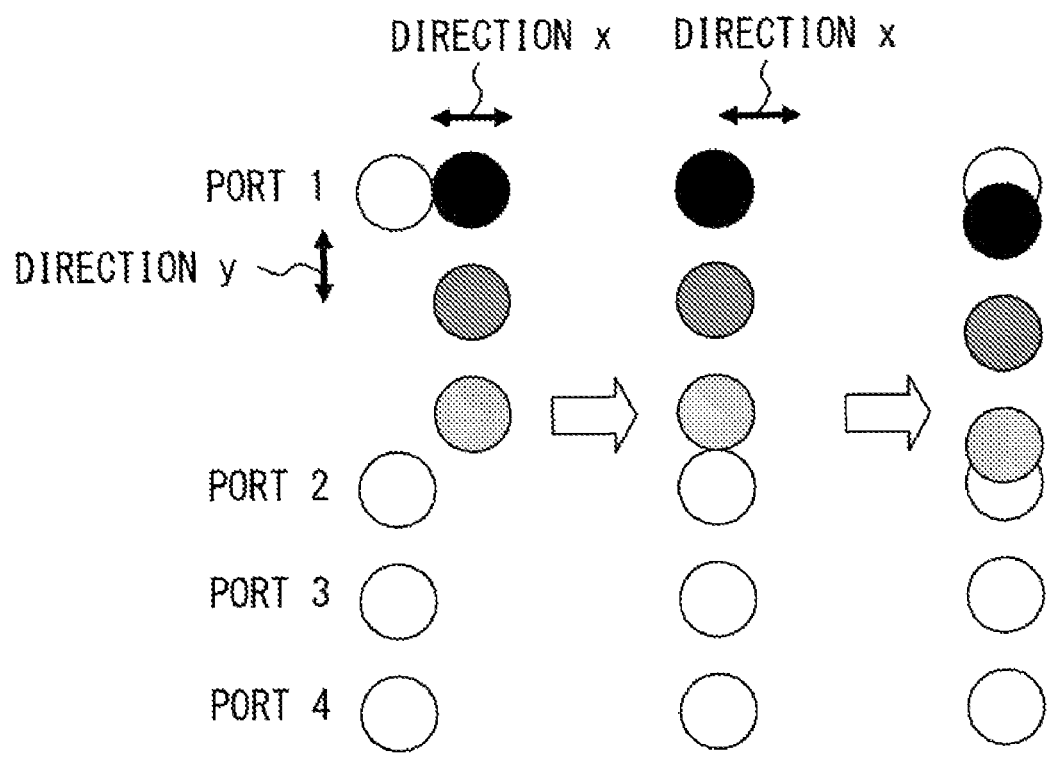
FIG. 5 illustrates an optical coupling image for an output port according to the first embodiment of the present invention.

FIG. 5 illustrates an optical coupling image for the output port according to the first embodiment of the present invention. In FIG. 5, the white circles indicate the positions of the ports, and the black and gray circles indicate the positions of the reflected light of the MEMS mirror 15.

When the angle of the MEMS mirror 15 is controlled in the direction orthogonal to the array direction of the ports 1 through 4 (direction x) by the fixed amount of attenuation, the reflected light enters the position shifted in the direction x for the output port 1. In this case, since the reflected light of other ports also enters the position shifted in the direction x, there is a small possibility of the occurrence of cross talk. When the reflection angle of the MEMS mirror 15 is controlled in the direction x, there is the possibility of the degradation of the transmission band characteristic of an optical signal. However, since the operation is being performed in the stage of the adjustment of the amount of attenuation, the problem is not serious.

Figure 6:
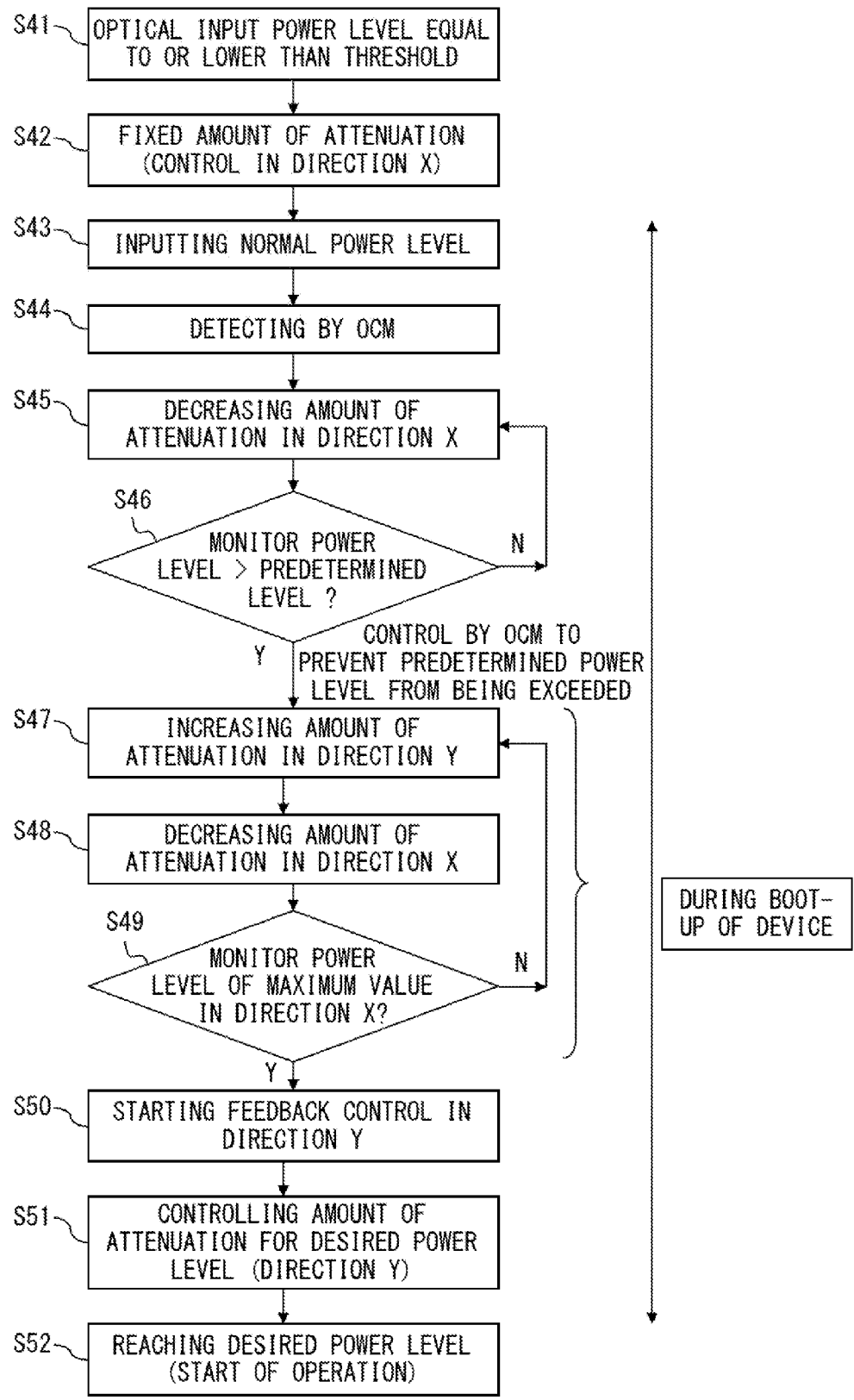
FIG. 6 illustrates a boot-up sequence according to the second embodiment of the present invention.

Next, when the fixed amount of attenuation in the direction x is set to 0, there is no shift in the direction x of the reflected light as illustrated in FIG. 6.

Next, If the feedback control is performed in the array direction of the ports 1 through 4, the reflected light of the MEMS mirror 15 enters the position shifted in the direction y for the output port 1. When the angle of the MEMS mirror 15 is controlled in the direction y, the incident positions of the reflected light of other ports approach the output port 1. However, in this stage, the signal power level detected by the optical channel monitor 39 approaches the target signal power level. Therefore, the angle of the MEMS mirror 15 is small, and the incident positions of the reflected light of other ports are apart from the position of the output port 1.

In the above-mentioned first embodiment, the angle of the MEMS mirror 15 is controlled in the direction orthogonal to the array direction of the ports 1 through 4 during boot-up. When the optical signal power level exceeds the threshold, the angle of the MEMS mirror 15 is feedback-controlled in the array direction of the ports 1 through 4. Thus, the angle control tolerance of a mirror can be increased to easily perform the angle control during boot-up, and the degradation of the transmission band characteristic can be reduced during operation. By reducing the degradation of the transmission band characteristic, the transmission distance can be expanded in the high-speed communications.

FIG. 6 illustrates the boot-up sequence of the wavelength selection switch 36 in the second embodiment of the present invention.

When the optical channel monitor 39 detects that the optical signal power level of any channel is equal to or lower than the threshold (S41 in FIG. 6), the control unit 40 controls the MEMS mirror 15 in the direction x by the fixed amount of attenuation (S42). In the process in step S42, the angle of the mirror of the corresponding channel of the MEMS mirror 15 is controlled in the direction orthogonal to the array direction of the ports 1 through 4 (spectral direction) by the fixed amount of attenuation.

Next, when an optical signal at a normal power level is input (S43) and the optical channel monitor 39 detects that the optical signal power level exceeds the threshold (S44), the control unit 40 decreases the angle in the direction x and reduces the amount of attenuation (S45).

Then, it is determined whether or not the monitor power level of the optical signal detected by the optical channel monitor 39 exceeds a predetermined power level (second threshold) (S46). If the monitor power level is equal to or lower than the predetermined power level (NO in S46), control is returned to step S45.

If the monitor power level exceeds the predetermined power level (YES in S46), control is passed to step S47, and the amount of attenuation in the direction y is increased. In the process in step S47, the angle in the array direction of the ports 1 through 4 of the corresponding mirror of the MEMS mirror 15 is increased (it can be decreased with the configuration different from that in the present embodiment).

Next, the amount of attenuation in the direction x is decreased (S48). In the process in step S48, for example, the angle is decreased in the direction orthogonal to the array direction of the ports 1 through 4 of the corresponding mirror of the MEMS mirror 15. The direction in which the amount of attenuation is decreased can be set not only in the method of controlling for a smaller angle in the vertical direction, but also in other control methods.

That is, when the monitor power level exceeds a predetermined power level, the angle of the MEMS mirror 15 is controlled in two directions, that is, the direction orthogonal to the array direction of the ports 1 through 4 (direction x) and the array direction of the ports 1 through 4 (direction y), thereby adjusting the amount of attenuation.

Next, the angle of the MEMS mirror 15 is controlled in the direction x to determine whether or not the maximum value of the monitor power level has been obtained (S49). If the maximum value has not been obtained (NO in S49), control is returned to step S47.

When the maximum value of the monitor power level has been obtained in the direction x (YES in S49), control is passed to step S50, and the feedback control in the direction y is started. Then, the amount of attenuation in the direction y is controlled so that the monitor power level detected by the optical channel monitor 39 can be at a desired power level (S51). If the desired signal power level has been reached, the operation of the corresponding channel is started.

In the processes in steps S50 and S51, the angle of the MEMS mirror 15 is feedback-controlled in the array direction of the ports 1 through 4 so that the signal power level of the reflected light of the MEMS mirror 15 can be a desired power level.

In the process in FIG. 6, the angle of the MEMS mirror 15 can be simultaneously controlled in the directions x and y. The threshold as a reference of an optical signal power level and the predetermined power level can be set to different valued for each wavelength.

FIGS. 7 through 9 illustrate the controlling operations of the wavelength selection switch according to the second embodiment.

Figure 7A:
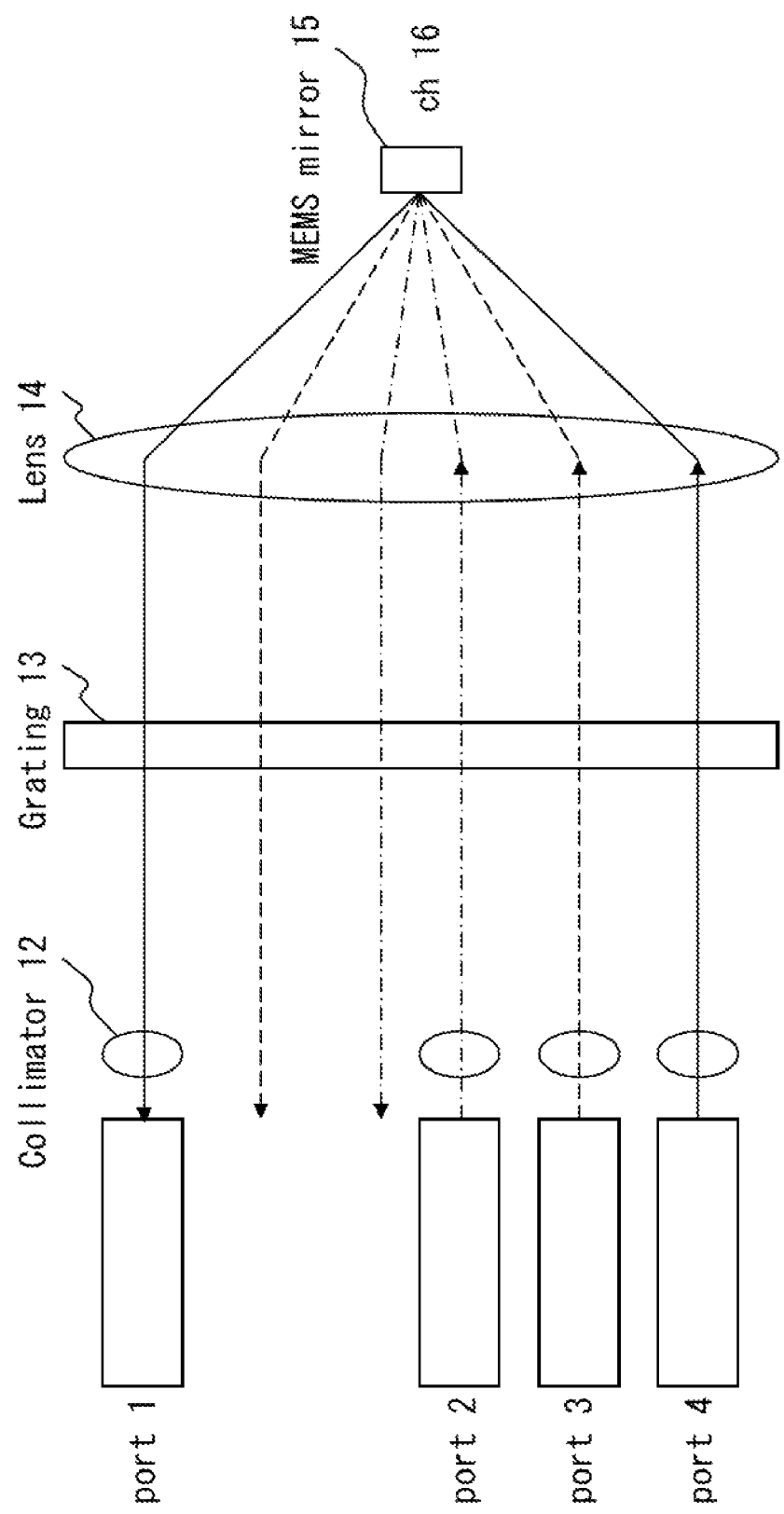
FIG. 7 is a view (1) of a controlling operation of a wavelength selection switch according to the second embodiment of the present invention.

FIG. 7A illustrates the plane including the ports 1 through 4 arranged in a line and viewed from above, and FIG. 7B is a top view from the array direction of the ports.

For simple explanation, the case in which an optical signal of the channel ch 16 of the input port 4 is output to the output port 1. When the optical signal power level detected by the optical channel monitor 39 is equal to or lower than the threshold, the control unit 40 controls the angle of the mirror of the corresponding channel of the MEMS mirror 15 in the direction orthogonal to the array direction of the ports 1 through 4 (spectral direction) so that a predetermined amount of attenuation can be obtained.

FIGS. 7A and 7B illustrate the controlling operations when the optical signal power level is equal to or lower than the threshold. In this case, the angle of the MEMS mirror 15 is controlled in the direction orthogonal to the array direction of the p lens 14 (direction x). Therefore, the light output from the ports 3 and 2 and reflected by the mirror of the channel ch 16 of the MEMS mirror 15 enters the position apart from the output port 1 as illustrated in FIG. 7A. Therefore, there is a small possibility that the reflected light of other ports leaks to the output port 1.

As illustrated in FIG. 7B, the light of the channel ch 16 output from the port 4 (existing on the reverse of the port 1 in FIG. 7) reflected by the MEMS mirror 15 in the direction x and enters the output port 1. In this case, the reflection angle of the MEMS mirror 15 is controlled so that the fixed amount of attenuation can be obtained for the optical signal.

FIGS. 8A and 8B illustrate the controlling operations of the wavelength selection switch when the optical signal power level is equal to or exceeds a predetermined power level.

When the optical signal power level detected by the optical channel monitor 39 is equal to or exceeds the predetermined power level, the control unit 40 sets a smaller angle in the direction x and decreases the amount of attenuation as illustrated in FIG. 8A.

In this case, although the control in the direction y is started and the angle is expanded, the optical signal power level is equal to or exceeds the predetermined power level. Therefore, it is not necessary to set an exceedingly large angle. Accordingly, the light output from the ports 2 and 3 and reflected by the mirror of the channel ch 16 of the MEMS mirror 15 enters the position apart from the output port 1 as illustrated in FIG. 8B. Therefore, there is a small possibility that the reflected light of other ports leaks to the output port 1.

Figure 9B:
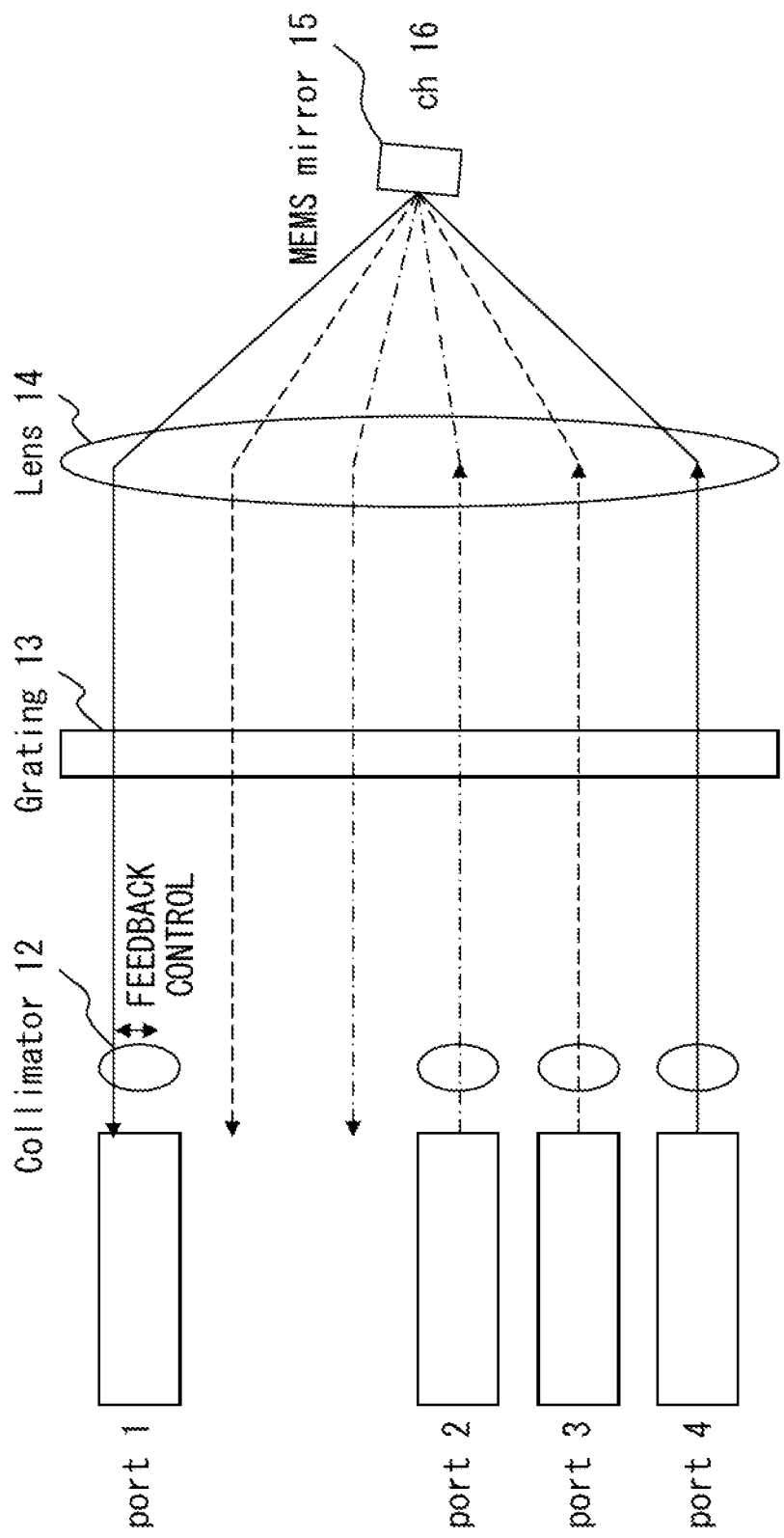
FIG. 9 is a view (3) of a controlling operation of a wavelength selection switch according to the second embodiment of the present invention.

FIGS. 9A and 9B illustrate the controlling operations performed when the monitor power level in the direction x indicates the maximum value and the feedback control is started.

The control unit 40 controls the angle of the MEMS mirror 15 in the directions x and y, and specifies the position in which the monitor power level indicates the maximum value after the control in the direction x, and the position illustrated in FIG. 9A.

If the monitor power level becomes the maximum value, the angle in the direction x is fixed and the feedback control is started in the direction y, that is, in the array direction of the ports 1 through 4.

When the feedback control in the direction y is started, the signal power level of the optical signal indicates the maximum value of the monitor power level in the direction x. Therefore, it is not necessary to set an exceedingly large angle in the direction y of the MEMS mirror 15. Accordingly, the light reflected by the mirror of the channel ch 16 of the MEMS mirror 15 enters the position apart from the output port 1 as illustrated in FIG. 9B. Thus, there is a small possibility that the light of other ports leaks to the output port 1.

Figure 10:
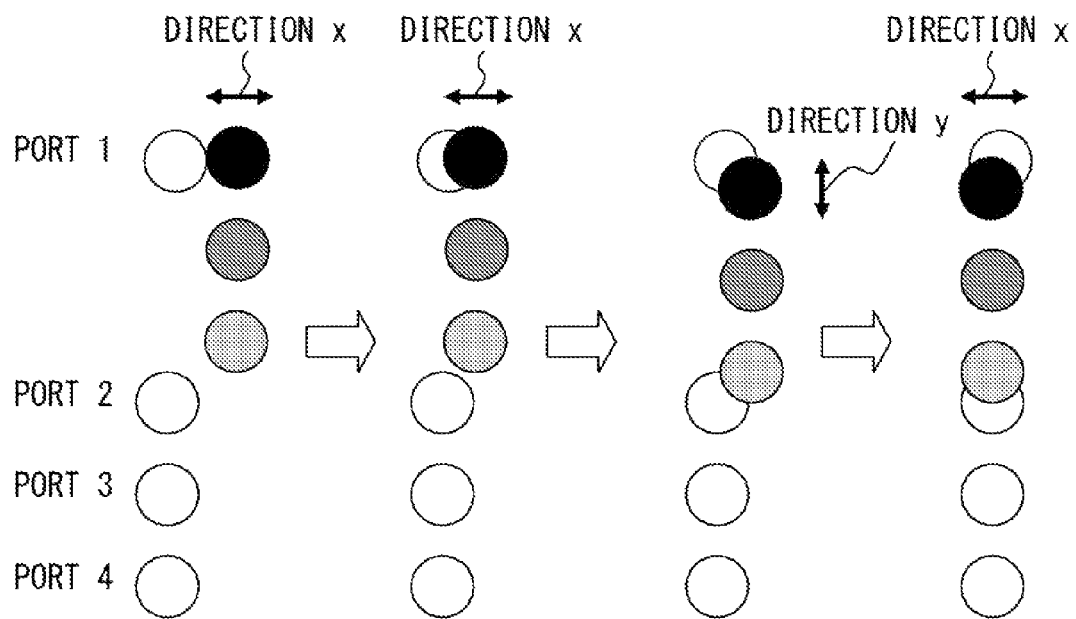
FIG. 10 illustrates an optical coupling image for an output port according to the second embodiment of the present invention.

FIG. 10 illustrates the optical coupling image for the output port according to the second embodiment of the present invention. In FIG. 10, the white circles indicate the positions of the ports 1 through 4, and the black and gray circles indicate the incident positions of the light reflected by the MEMS mirror 15.

When the signal power level is equal to or lower than the threshold, the MEMS mirror 15 is controlled in the direction orthogonal to the array direction of the ports 1 through 4 (direction x) by the fixed amount of attenuation. In this case, the reflected light enters the position shifted in the direction x for the output port 1 as illustrated in FIG. 10. Since the reflected light of other ports also enters the position largely shifted in the direction x, there is a small possibility of the occurrence of cross talk. When the reflection angle of the MEMS mirror 15 is controlled in the direction x, the transmission band characteristic of an optical signal can be degraded, but the problem of the degradation of a signal is not serious because the amount of attenuation is being adjusted.

Next, when it is detected that the signal power level is higher than the threshold, the amount of attenuation in the direction x is reduced. The position of the reflected light in this case is horizontally shifted to the left as viewed from the front in FIG. 10, and approaches the position of the output port 1.

Next, when it is detected that the signal power level exceeds a predetermined power level, control in the directions x and y is simultaneously started on the MEMS mirror 15. When the control in the direction y is started, the reflected light enters the position shifted in the direction y from the output port 1.

Afterwards, when the maximum value of the monitor power level is obtained in the control in the direction x, the angle in the direction x is fixed, and the feedback control in the direction y is performed.

Therefore, during the operation, the degradation of the transmission band characteristic can be reduced by controlling the angle of the MEMS mirror 15 in the array direction of the ports 1 through 4.

In the above-mentioned second embodiment, the angle of the MEMS mirror 15 is controlled in the direction orthogonal to the array direction of the ports 1 through 4 during boot-up, thereby preventing the reflected light of other ports from leaking to the output port. In addition, when the signal power level exceeds the predetermined value, the control in the array direction of the ports 1 through 4 and the control in the direction orthogonal to the array direction are performed in combination to specify the angle at which the monitor power level is the maximum value in the direction orthogonal to the array direction, and then the feedback control is performed in the array direction of the ports, thereby suppressing the cross talk and realizing the control of the MEMS mirror 15 with less degradation in transmission band characteristic.

Figure 11:
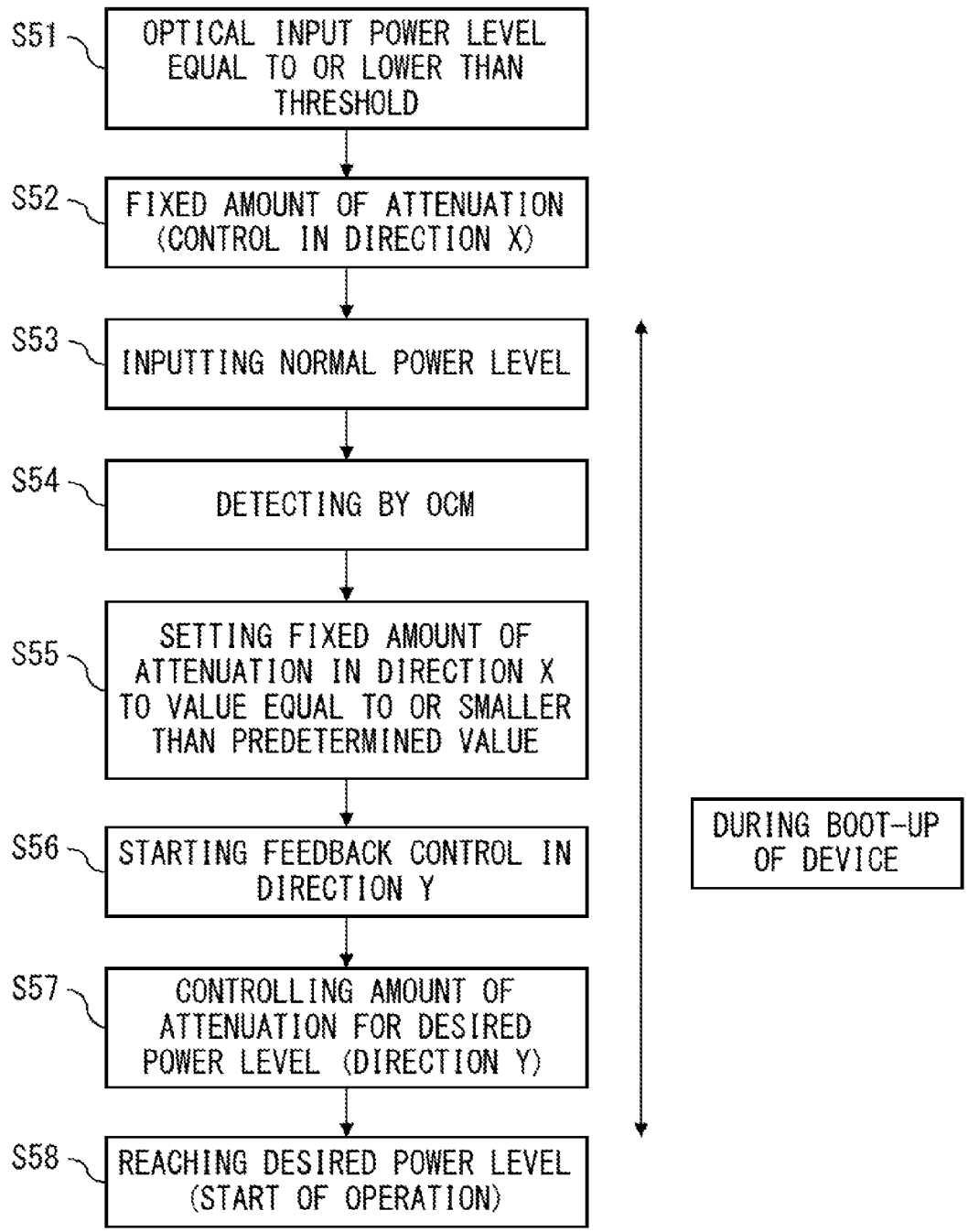
FIG. 11 illustrates a boot-up sequence according to the third embodiment of the present invention.

Next, FIG. 11 illustrates the boot-up sequence of the wavelength selection switch according to the third embodiment of the present invention.

When the optical channel monitor 39 detects that the optical signal power level is equal to or smaller than the threshold (S51 in FIG. 11), the control unit 40 controls the angle of the MEMS mirror 15 in the direction orthogonal to the array direction of the ports (direction x) by the fixed amount of attenuation (S52).

When an optical signal at the normal power level is input (S53), the optical channel monitor 39 detects that the optical signal power level of the corresponding wavelength exceeds the threshold (S54).

When it is detected that the optical signal power level exceeds the threshold, the control unit 40 sets the fixed amount of attenuation of the corresponding channel to a value equal to or smaller than a predetermined value. As a result, the angle of the corresponding mirror of the MEMS mirror 15 is set to an angle smaller than the angle set before.

Next, the feedback control in the direction y with respect to the MEMS mirror 15, that is, the array direction of the ports, is started (S56). When the feedback control is started, the angle of the MEMS mirror 15 is controlled so that the optical signal power level of each channel detected by the optical channel monitor 39 can be a desired power level (S57). When the optical signal power level reaches the desired power level, the operation of the corresponding channel is started (S58).

FIG. 12 illustrates an optical coupling image for the output port according to the third embodiment. In FIG. 13, the white circles indicate the positions of the ports 1 through 4, and the black and gray circles indicate the positions of the reflected light reflected by the MEMS mirror 15.

When the signal power level is equal to or lower than the threshold, the MEMS mirror 15 is controlled in the direction orthogonal to the array direction of the ports 1 through 4 (direction x) by the fixed amount of attenuation. In this case, as illustrated in FIG. 12, the reflected light enters the position shifted in the direction x from the output port 1 by the fixed amount of attenuation. Since the reflected light of other ports also enter the positions shifted in the direction x, there is a small possibility of an occurrence of cross talk.

Next, when it is detected that the signal power level is higher than the threshold, the amount of attenuation in the direction x is set to a value equal to or smaller than a predetermined value, and the feedback control is started in the direction y. In this case, as illustrated in FIG. 12, the reflected light enters the position shifted in the direction y for the output port 1. Since the control in the direction x by the predetermined amount of attenuation is simultaneously performed, the reflected light enters the position determined by the control in the direction x and the feedback control in the direction y.

In the above-mentioned third embodiment, controlling the angle of the MEMS mirror 15 in the direction orthogonal to the array direction of the ports 1 through 4 during boot-up can prevent the reflected light of other ports from leaking to the output port. When the signal power level exceeds a predetermined value, the control of the MEMS mirror 15 with low cross talk and degradation of the transmission band characteristic can be realized by combining the control in the array direction of the ports 1 through 4 and the control in the direction orthogonal to the array direction by a predetermined amount of attenuation.

FIG. 13 illustrates the controlling operation of the wavelength selection switch 36 according to the fourth embodiment of the present invention. In the fourth embodiment, the angle control of the MEMS mirror 15 performed in the direction x during boot-up in the first embodiment is performed in the direction determined by the vector in the directions x and y.

When the angle of the MEMS mirror 15 is controlled, completely matching the array direction of the ports or the direction orthogonal to the array direction of the ports is difficult due to the variance of parts, control errors, etc. The control method according to the embodiments of the present invention aims at moderating the control tolerance in the angle control of the MEMS mirror 15, and preventing the degradation of the transmission band characteristic. Therefore, it does not limit the control direction only to the direction x or y. That is, controlling in the direction x or y can be mainly performed by controlling in the z (x, y) axis direction using the vector in the directions x and y as a function.

FIG. 13 illustrates the positions of the ports 1 through 4 and the path of the reflected light when control is performed in the directions x and y. In this case, during boot-up, the possibility that the reflected light of other ports can leak to the output port 1 can be reduced by increasing the amount of attenuation in the direction x.

According to the fourth embodiment described above, when boot-up is performed with the optical signal power level equal to or lower than the threshold, the amount of control of the angle of the MEMS mirror 15 in the direction orthogonal to the array direction of the ports 1 through 4 (direction x) is increased to suppress the occurrence of cross talk. When the optical signal power level exceeds the threshold, the feedback control in the array direction of the ports 1 through 4 is mainly performed, thereby reducing the degradation of the transmission band characteristic.

Figure 14:
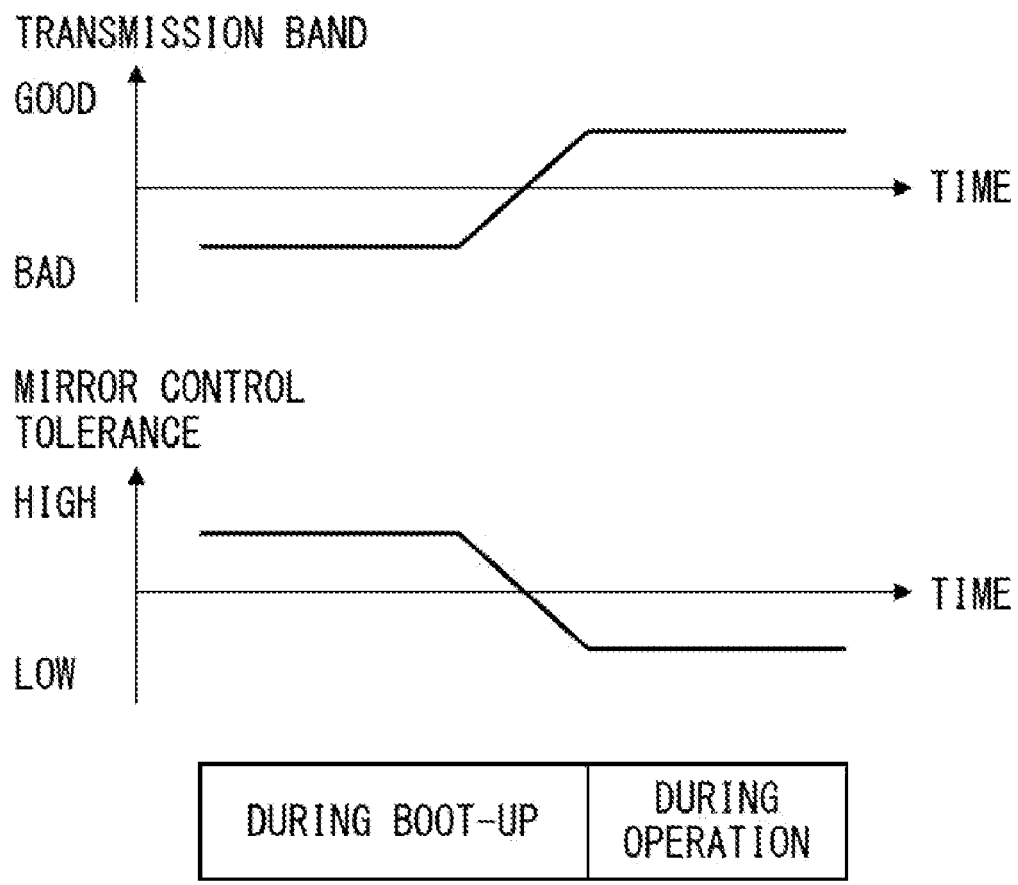
FIG. 14 illustrates the transmission band characteristic and the mirror control tolerance in the control method according to an embodiment of the present invention.

FIG. 14 illustrates the transmission band characteristic and the mirror control tolerance in the control method of an embodiment of the present invention.

In the control method according to an embodiment of the present invention the possibility of the occurrence of cross talk can be suppressed by controlling the angle of the MEMS mirror 15 in the direction orthogonal to the array direction of the ports 1 through 4 during boot-up. Therefore, the angle control tolerance during boot-up can be increased. In addition, during the operation, the angle of the MEMS mirror 15 is controlled in the array direction of the ports 1 through 4 so that the degradation of the transmission band characteristic can be prevented.

The above-mentioned wavelength division multiplexing transmission device, the angle control tolerance can be enhanced and the degradation of the transmission band during operation can be reduced.

The present invention is not limited to the above-mentioned embodiments. For example, the following configurations can be applied.

(1) The amount of attenuation of a wavelength selection switch can be controlled not only by the MEMS mirror 15, but also any other optical elements that can control the position of reflected light.

(2) The present invention can be applied not only to an OADM device, but also to a terminal and a relay device without an add-drop function. In addition, the present invention can be applied not only to a ring network, but also to other networks such as a point-to-point network, a mesh network, etc. Furthermore, the OADM configurations described in this specification are only examples, and it can be applied to other configurations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wavelength division multiplexing transmission device, comprising:
a plurality of ports where a wavelength division multiplexed optical signal is input and output;
a wavelength demultiplexing unit demultiplexing the wavelength division multiplexed optical signal;
an attenuation unit controlling a coupling direction for the ports of a wavelength demultiplexed optical signal of each wavelength and controlling an amount of attenuation;
a detection unit detecting a power level of an optical signal at an output terminal; and
a control unit controlling the coupling direction of the attenuation unit in a direction orthogonal to an array direction of the ports when the detection unit detects that a power level of the optical signal reaches a first threshold or lower, and controlling the coupling direction of the attenuation unit in the array direction of the ports when the detection unit detects that the power level of the optical signal exceeds a second threshold.

2. The device according to claim 1, wherein
the control unit controls the coupling direction of the attenuation unit in the direction orthogonal to the array direction of the ports when the power level of the optical signal is equal to or lower than the first threshold, and decreases an amount of control in the direction orthogonal to the array direction of the ports and increases an amount of control in the array direction of the ports when the detection unit detects that the power level of the optical signal exceeds the second threshold.

3. The device according to claim 2, wherein
the control unit controls the coupling direction of the attenuation unit in the direction orthogonal to the array direction of the ports, and controls the coupling direction of the attenuation unit in the array direction of the ports when the power level of the optical signal detected by the detection unit indicates a maximum value.

4. The device according to claim 1, wherein:
the attenuation unit has a plurality of mirrors whose angles can be adjusted; and
the control unit controls the angle of a corresponding mirror in the plurality of mirrors in the direction orthogonal to the array direction of the ports when the power level of the optical signal is equal to or lower than the first threshold, and controls the angle of the corresponding mirror in the array direction of the ports when the power level of the optical signal exceeds the second threshold.

5. The device according to claim 1, wherein
the control unit controls the coupling direction of the attenuation unit simultaneously in the array direction of the ports and in the direction orthogonal to the array direction of the ports.

6. The device according to claim 1, wherein:
the attenuation unit is a MEMS mirror having a plurality of mirrors whose angles can be adjusted; and
the control unit controls the angle of a corresponding mirror of the MEMS mirror in the direction orthogonal to the array direction of the ports when the power level of the optical signal is equal to or lower than the first threshold, and controls the angle of the corresponding mirror in the array direction of the ports when the power level of the optical signal exceeds the second threshold.

7. The device according to claim 1, wherein
the threshold is set for each wavelength.

8. A wavelength division multiplexing transmission method, comprising:
demultiplexing a wavelength division multiplexed optical signal in a plurality of input ports;
detecting a power level of an optical signal at an output terminal of a wavelength selection switch; and
controlling an amount of attenuation by controlling a coupling direction of the optical signal for an output port in a direction orthogonal to an array direction of the output port when it is detected that a power level of the optical signal is equal to or lower than a threshold, and controlling the coupling direction in the array direction of the output port when it is detected that the power level of the optical signal exceeds the threshold.

9. The method according to claim 8, wherein
when it is detected that the power level of the optical signal is equal to or lower than a first threshold, the coupling direction of the optical signal is controlled in the direction orthogonal to the array direction of the output port, and when it is detected that the power level of the optical signal exceeds a second threshold, an amount of control in the direction orthogonal to the array direction of the output port is decreased, and an amount of control in the array direction of the output port is increased.

10. The method according to claim 8, wherein
the coupling direction of the optical signal is controlled in the direction orthogonal to the array direction of the output port, and when the power level of the optical signal reaches a maximum value, the coupling direction is controlled in the array direction of the output port.

11. The method according to claim 8, wherein:

an angle of a corresponding mirror in an MEMS mirror having a plurality of mirrors is controlled in the direction orthogonal to the array direction of the output port when the power level of the optical signal is equal to or lower than a first threshold, and the angle of the corresponding mirror in the array direction of the output port when the power level of the optical signal exceeds a second threshold.

12. A wavelength selection switch, comprising:

a wavelength demultiplexing unit demultiplexing the wavelength division multiplexed optical signal;

an attenuation unit controlling a coupling direction for the ports of a wavelength demultiplexed optical signal of each wavelength and controlling an amount of attenuation;

a detection unit detecting a power level of an optical signal at an output terminal; and a control unit controlling the coupling direction of the attenuation unit in a direction orthogonal to an array direction of the output port when the detection unit detects that a power level of the optical signal reaches a first threshold or lower, and controlling the coupling direction of the attenuation unit in the array direction of the output port when the detection unit detects that the power level of the optical signal exceeds a second threshold.

13. The switch according to claim 12, wherein the control unit controls the coupling direction of the attenuation unit in the direction orthogonal to the array direction of the output port when the power level of the optical signal at an output terminal is equal to or lower than the first threshold, and decreases an amount of control in the direction orthogonal to the array direction of the output port of the attenuation unit and increases an amount of control in the array direction of the output port when the detection unit detects that the power level of the optical signal exceeds the second threshold.

14. The switch according to claim 13, wherein the control unit controls the coupling direction of the attenuation unit in the direction orthogonal to the array direction of the output port, and controls the coupling direction of the attenuation unit in the array direction of the output port when the power level of the optical signal detected by the detection unit indicates a maximum value.

15. The switch according to claim 12, wherein:

the attenuation unit has a plurality of mirrors whose angles can be adjusted; and the control unit controls the angle of a corresponding mirror in the plurality of mirrors in the direction orthogonal to the array direction of the output port when the power level of the optical signal is equal to or lower than the first threshold, and controls the angle of the corresponding mirror in the array direction of the output port when the power level of the optical signal exceeds the second threshold.

* * * * *